(12) United States Patent
Kuhlman et al.

(10) Patent No.: US 12,012,475 B2
(45) Date of Patent: Jun. 18, 2024

(54) METHOD OF OLEFIN POLYMERIZATION USING ALKANE-SOLUBLE NON-METALLOCENE PRECATALYST

(71) Applicant: Dow Global Technologies LLC, Midland, MI (US)

(72) Inventors: Roger L. Kuhlman, Lake Jackson, TX (US); Bethany M. Neilson, Manvel, TX (US); John F. Szul, Hurricane, WV (US); Ian M. Munro, Lake Jackson, TX (US)

(73) Assignee: DOW GLOBAL TECHNOLOGIES LLC, Midland, MI (US)

(*) Notice: Subject to any disclaimer, the term of this patent is extended or adjusted under 35 U.S.C. 154(b) by 552 days.

(21) Appl. No.: 17/279,240

(22) PCT Filed: Oct. 11, 2019

(86) PCT No.: PCT/US2019/055908
§ 371 (c)(1),
(2) Date: Mar. 24, 2021

(87) PCT Pub. No.: WO2020/096735
PCT Pub. Date: May 14, 2020

(65) Prior Publication Data
US 2021/0403615 A1  Dec. 30, 2021

Related U.S. Application Data

(60) Provisional application No. 62/771,699, filed on Nov. 27, 2018, provisional application No. 62/756,237, (Continued)

(51) Int. Cl.
C08F 4/64       (2006.01)
C08F 2/34       (2006.01)
(Continued)

(52) U.S. Cl.
CPC ............ *C08F 4/64148* (2013.01); *C08F 2/34* (2013.01); *C08F 210/02* (2013.01); *C08F 210/06* (2013.01);
(Continued)

(58) Field of Classification Search
CPC ...... C08F 4/64148; C08F 2/34; C08F 210/02; C08F 210/06
See application file for complete search history.

(56) References Cited

U.S. PATENT DOCUMENTS

| 3,709,853 A | 1/1973 | Karapinka |
| 4,003,712 A | 1/1977 | Miller |

(Continued)

FOREIGN PATENT DOCUMENTS

| EP | 0279586 | 8/1988 |
| EP | 0511665 | 11/1992 |

(Continued)

OTHER PUBLICATIONS

Liang, "Synthesis of Group 4 Complexes that Contain the Diamidoamine Ligands, [(2,4,6-Me3C6H2NCH2CH2)2NR] 2-([Mes2N2NR]2-; R=H or CH3), and Polymerization of 1-Hexene by Activated [Mes2N2NR]ZrMe2 Complexes", J. Am. Chem. Soc., 1999, p. 5797-5798, vol. 121.

(Continued)

*Primary Examiner* — Catherine S Branch

(57) ABSTRACT

A method of polymerizing an olefin monomer to make a polyolefin composition comprising a polyolefin polymer, the method comprising contacting a solution of an alkane-soluble non-metallocene precatalyst dissolved in an alkane solvent with an activator so as to make a trim catalyst comprising an alkane-soluble non-metallocene catalyst, feeding the trim catalyst, as a solution in an alkane solvent or supported on a support material as a dry powder or a slurry thereof in an alkane solvent, into a polymerization (Continued)

reactor, and polymerizing the olefin monomer with the trim catalyst in the polymerization reactor, thereby making the polyolefin composition.

FIG. 2

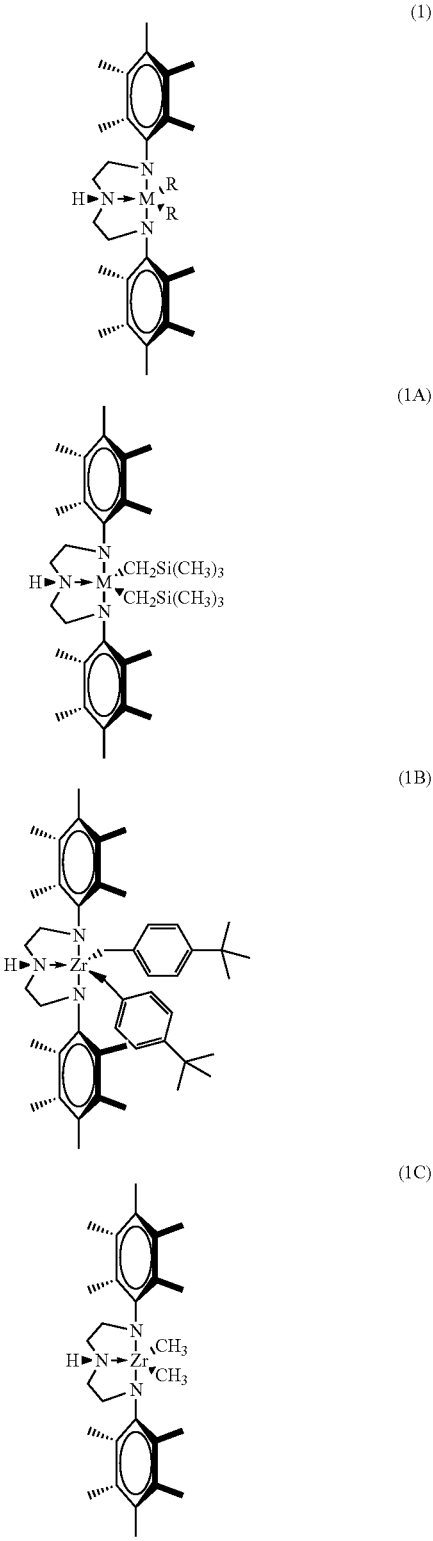

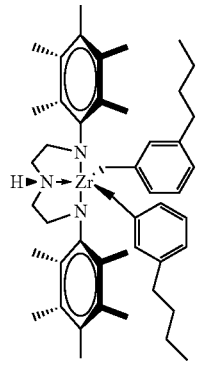

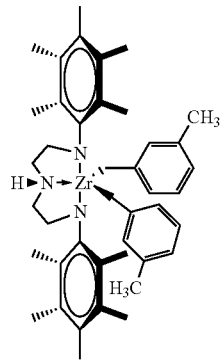

12 Claims, 3 Drawing Sheets

Related U.S. Application Data filed on Nov. 6, 2018, provisional application No. 62/756,236, filed on Nov. 6, 2018.

(51) Int. Cl.
  *C08F 210/02* (2006.01)
  *C08F 210/06* (2006.01)
  *C08F 210/08* (2006.01)
  *C08F 210/14* (2006.01)
  *C08F 210/16* (2006.01)

(52) U.S. Cl.
  CPC .......... *C08F 210/08* (2013.01); *C08F 210/14* (2013.01); *C08F 210/16* (2013.01)

(56) References Cited

U.S. PATENT DOCUMENTS

| | | |
|---|---|---|
| 4,011,382 A | 3/1977 | Levine et al. |
| 4,302,566 A | 11/1981 | Karol et al. |
| 4,453,399 A | 6/1984 | Thompson |
| 4,543,399 A | 9/1985 | Jenkins, III et al. |
| 4,588,790 A | 5/1986 | Jenkins, III et al. |
| 4,665,208 A | 5/1987 | Welborn, Jr. et al. |
| 4,874,734 A | 10/1989 | Kioka et al. |
| 4,882,400 A | 11/1989 | Dumain et al. |
| 4,908,463 A | 3/1990 | Bottelberghe |
| 4,924,018 A | 5/1990 | Bottelberghe |
| 4,952,540 A | 8/1990 | Kioka et al. |
| 4,968,827 A | 11/1990 | Davis |
| 4,988,783 A | 1/1991 | Beran et al. |
| 4,994,534 A | 2/1991 | Rhee et al. |

(56) References Cited

U.S. PATENT DOCUMENTS

| | | |
|---|---|---|
| 5,041,584 A | 8/1991 | Crapo et al. |
| 5,091,352 A | 2/1992 | Kioka et al. |
| 5,103,031 A | 4/1992 | Smith, Jr. |
| 5,157,137 A | 10/1992 | Sangokoya |
| 5,204,419 A | 4/1993 | Tsutsui et al. |
| 5,206,199 A | 4/1993 | Kioka et al. |
| 5,235,081 A | 8/1993 | Sangokoya |
| 5,248,801 A | 9/1993 | Sangokoya |
| 5,318,935 A | 6/1994 | Canich et al. |
| 5,329,032 A | 7/1994 | Tran et al. |
| 5,352,749 A | 10/1994 | DeChellis et al. |
| 5,462,999 A | 10/1995 | Griffin et al. |
| 5,473,202 A | 12/1995 | Mudge et al. |
| 5,506,184 A | 4/1996 | Kissin et al. |
| 5,541,270 A | 7/1996 | Chinh et al. |
| 5,627,242 A | 5/1997 | Jacobsen et al. |
| 5,648,310 A | 7/1997 | Wasserman et al. |
| 5,665,818 A | 9/1997 | Tilston et al. |
| 5,677,375 A | 10/1997 | Rifi et al. |
| 5,688,880 A | 11/1997 | Spencer et al. |
| 5,770,755 A | 6/1998 | Schertl et al. |
| 5,889,128 A | 3/1999 | Schrock et al. |
| 5,965,477 A | 10/1999 | Sivaram et al. |
| 5,972,510 A | 10/1999 | O'Hare et al. |
| 6,034,187 A | 3/2000 | Maehama et al. |
| 6,255,419 B1 | 7/2001 | Imuta et al. |
| 6,274,684 B1 | 8/2001 | Loveday et al. |
| 6,489,408 B2 | 12/2002 | Mawson et al. |
| 6,534,604 B2 | 3/2003 | Loveday et al. |
| 6,841,631 B2 | 1/2005 | Loveday et al. |
| 6,858,684 B2 | 2/2005 | Burdett et al. |
| 6,894,128 B2 | 5/2005 | Loveday et al. |
| 6,949,612 B2 | 9/2005 | Agapiou et al. |
| 6,967,184 B2 | 11/2005 | Wenzel et al. |
| 6,995,217 B2 | 2/2006 | Agapiou et al. |
| 7,163,991 B2 | 1/2007 | Wenzel et al. |
| 7,196,032 B2 | 3/2007 | Wenzel et al. |
| 7,276,566 B2 | 10/2007 | Muruganandam et al. |
| 7,479,529 B2 | 1/2009 | Wenzel et al. |
| 7,566,677 B2 | 7/2009 | Muruganandam et al. |
| 7,718,566 B2 | 5/2010 | Wenzel et al. |
| 7,754,840 B2 | 7/2010 | Loveday et al. |
| 7,873,112 B2 | 1/2011 | Nakamura |
| 7,973,112 B2 | 7/2011 | Muruganandam et al. |
| 8,291,115 B2 | 10/2012 | Bitterlich |
| 9,234,060 B2 | 1/2016 | Kao et al. |
| 9,902,790 B2 | 2/2018 | Vanderlende et al. |
| 2005/0182210 A1 | 8/2005 | Muruganandam et al. |
| 2005/0182212 A1 | 8/2005 | Wenzel et al. |
| 2006/0173123 A1 | 8/2006 | Yang et al. |
| 2016/0032025 A1 | 2/2016 | Giesbrecht |
| 2018/0002464 A1 | 1/2018 | Fontaine et al. |
| 2018/0079836 A1 | 3/2018 | Locklear et al. |
| 2018/0118862 A1 | 5/2018 | Savatsky et al. |

FOREIGN PATENT DOCUMENTS

| | | |
|---|---|---|
| EP | 0561476 | 9/1993 |
| EP | 0594218 | 4/1994 |
| EP | 0634421 | 1/1995 |
| EP | 0649992 | 4/1995 |
| EP | 0767184 | 4/1997 |
| EP | 0794200 | 9/1997 |
| EP | 0802202 | 10/1997 |
| EP | 0802203 | 10/1997 |
| WO | 1994/10180 | 5/1994 |
| WO | 199947598 | 9/1999 |
| WO | 199948605 | 9/1999 |
| WO | 199950311 | 10/1999 |
| WO | 199960033 | 11/1999 |
| WO | 2011087520 | 7/2011 |
| WO | 2013070601 | 5/2013 |
| WO | WO-2016172567 A1 * | 10/2016 ............ C08F 210/16 |

OTHER PUBLICATIONS

Schrock, "Preparation and Activation of Complexes of the Type [((mesityl) NCH2CH2)2NX]ZrME2 (X=H, Me) with [Ph3C][B(C6F5)4] or [PhNMe2H][B(C6F5)4]", Organometallics, 2000, p. 5325-5341, vol. 19.

PCT/US2019/055908, International Search Report and Written Opinion with a mailing date of Mar. 6, 2020.

Schrock, "Cationic Zirconium Complexes that Contain Mesityl-Substituted Diamido/Donor Ligands. Decomposition via CH Activation and Its Influence on 1-Hexene Polymerization", Organometallics, 2001, p. 3560-3573, vol. 20.

Office Action Report Letter from corresponding Japanese Application No. 2021-521020 dated Nov. 7, 2023.

* cited by examiner

US 12,012,475 B2

METHOD OF OLEFIN POLYMERIZATION USING ALKANE-SOLUBLE NON-METALLOCENE PRECATALYST

FIELD

Catalyzed Olefin Polymerization.

Publications and patents in or about the field include US20050182210A1; US20180002464A1; US20180079836A1; U.S. Pat. Nos. 5,318,935; 5,506,184; 5,889,128; 6,255,419B1; 6,274,684B1; 6,534,604B2; 6,841,631B2; 6,858,684B2; 6,894,128B2; 6,949,612B2; 6,967,184B2; 6,995,217B2; 7,163,991B2; 7,196,032B2; 7,276,566B2; 7,479,529B2; 7,566,677B2; 7,718,566B2; 7,754,840B2; 7,973,112B2; and 9,902,790B2. U.S. Pat. No. 6,967,184B2 mentions synthesis of $HN5Zr(NMe_2)_2$. US20180002464A1 mentions biphenylphenolic precatalysts ("procatalysts", e.g., compounds 1 to 7 of paragraph [0104]). U.S. Pat. No. 7,973,112B2 mentions a spray-dried catalyst containing bis(phenylmethyl)[N'-(2,3,4,5,6-pentamethylphenyl)-N-[2-(2,3,4,5,6-pentamethylphenyl)amino-κN]ethyl]-1,2-ethane-diaminato(2-)κN,κN']zirconium or "HN5Zr", abbreviated herein as "HN5Zr dibenzyl" and (n-propylcyclopentadienyl) (tetramethylcyclopentadienyl)zirconium dichloride. U.S. Pat. Nos. 6,858,684B2, 6,949,612B2, 6,995,217B2, and US20180079836A1 mention catalyst transitions.

INTRODUCTION

We describe solutions to one or more problems relating to polymerizing an olefin monomer with a bimodal catalyst system comprising a higher molecular weight (HMW) polyethylene-making catalyst made from an alkane-insoluble non-metallocene precatalyst (e.g., HN5Zr dibenzyl) and an activator and a lower molecular weight (LMW) polyethylene-making metallocene (MCN) catalyst. The bimodal catalyst system makes in a single reactor a bimodal polyethylene composition comprising a HMW polyethylene component and a LMW polyethylene component. Some of the problems relate to unwanted gels in a post-reactor melt-blended bimodal polyethylene composition. Other problems relate to transition complexity and stability of the bimodal catalyst system.

The bimodal catalyst system comprises, or is made from, a metallocene (MCN) precatalyst, a non-metallocene precatalyst that is insoluble in alkanes ("insoluble non-MCN" precatalyst), at least one activator, and a support material (solid). The insoluble non-MCN precatalyst (e.g., HN5Zr dibenzyl) makes the HMW polyethylene component of a bimodal polyethylene composition. The MCN precatalyst is soluble in alkanes and the MCN catalyst makes the LMW polyethylene component of the bimodal polyethylene composition. The gel problem can arise if the insoluble non-MCN precatalyst and its activator are fed into the polymerization reactor separately from a feed of the MCN precatalyst and its activator. Then the resulting HMW and LMW polyethylene components would be initially made separately in the reactor, and may not homogeneously mix together thereafter. This may make a comparative bimodal polyethylene composition undesirably having increased gel content, where the gels are composed of portions of the HMW polyethylene component. The comparative bimodal polyethylene composition may have a gel content that is too high for applications requiring clarity such as films and/or for applications requiring high strength such as pipes.

To decrease or avoid the gel problem, the bimodal catalyst system is formulated in two parts. A first part comprises a slurry of the support, an alkanes solvent, the at least one activator, all of the insoluble non-MCN precatalyst, and some of the MCN precatalyst. A second part comprises a solution of the remainder of the MCN precatalyst in an alkane(s) solvent, but none of the insoluble non-MCN precatalyst, activator, or support. In a "combining-the-parts" feed method, the first and second parts are fed separately into an in-line mixer, where they mix to make the bimodal catalyst system. This fresh bimodal catalyst system is fed into a single polymerization reactor.

The combining-the-parts feed method has some flexibility to achieve various polymerization rates and to enable making various bimodal polyethylene compositions with various polymer attributes in the single polymerization reactor. For example, the flow rate of the feed of the second part may be adjusted to supplement the effect of the portion of the MCN precatalyst in the first part (e.g., make more of the LMW polyethylene component), or to "trim" or modulate the effects of the insoluble non-MCN precatalyst of the first part (e.g., increase the LMW/HMW ratio), enabling making various bimodal polyethylene compositions. Thus, the second part is called a "trim catalyst". The combining-the-parts feed method allows control within limits of the polymerization reaction making the bimodal polyethylene composition and varying within limits of the LMW/HMW ratio so as to transition between various bimodal polyethylene compositions in the single polymerization reactor.

The first part beneficially contains all of the insoluble non-MCN precatalyst, activator, and some of the MCN precatalyst, and is pre-mixed with a desired amount of the second part (trim catalyst) to make the bimodal catalyst system before it enters a polymerization reactor. This is done in order to make a so-called reactor blend of the HMW and LMW polyethylene components in the polymerization reactor, whereby the HMW and LMW polyethylene components are made in situ in intimate contact with each other. This reactor blend results in a bimodal polyethylene composition having better mixing of the HMW and LMW polyethylene components, and thus a decreased gel content.

Unfortunately the HMW/LMW ratio in the combining-the-parts feed method cannot be zero or near zero because the first part of the bimodal catalyst system contains both the MCN precatalyst and the insoluble non-MCN precatalyst, and therefore the bimodal polyethylene composition made thereby always contains some amount of both the LMW polyethylene component and the HMW polyethylene component.

Further, transitions between bimodal catalyst systems ("catalyst transitions") such as between different precatalysts or between different amounts of a same precatalyst in the single polymerization reactor are complex. For example, it is complex to transition from a first bimodal catalyst system comprising a first MCN catalyst (abbreviated LMW-CAT-1) and a first insoluble non-MCN precatalyst to a second bimodal catalyst system comprising a second MCN catalyst (abbreviated LMW-CAT-2) and the same first insoluble non-MCN precatalyst, wherein LMW-CAT-1 and LMW-CAT-2 are different from each other and from the insoluble non-MCN precatalyst. Even though the insoluble non-MCN precatalyst is the same in the first parts of both the first and second bimodal catalyst systems, both the first and second parts of the first bimodal catalyst system must be replaced in order to transition to the second bimodal catalyst system. This is because both the first and second parts contain the no longer wanted LMW-CAT-1 component.

Also, certain insoluble non-MCN precatalysts become unstable after being mixed with the activator. It is necessary to chill those first parts (containing unstable/insoluble non-MCN precatalyst) of the bimodal catalyst system to about −10 degrees Celsius (° C.) for shipment or storage thereof. Then, the second part may need to be reformulated to withstand cooling "shock" when it contacts the chilled first part in the in-line mixer. Or the first part may need to be warmed before being fed into the in-line mixer.

And because insoluble non-MCN precatalyst is insoluble in alkanes, it is not suitable for use in the second part (trim catalyst) in the combining-the-parts feed method.

SUMMARY

A method of polymerizing an olefin monomer to make a polyolefin composition, the method comprising contacting a solution of an alkane-soluble non-metallocene precatalyst dissolved in an alkane solvent with an activator so as to make a trim catalyst comprising an alkane-soluble non-metallocene catalyst, feeding the trim catalyst, as a solution in an alkane solvent or supported on a support material as a dry powder or a slurry thereof in an alkane solvent, into a polymerization reactor, and polymerizing the olefin monomer with the trim catalyst in the polymerization reactor, thereby making the polyolefin composition.

DETAILED DESCRIPTION

Figure 1:
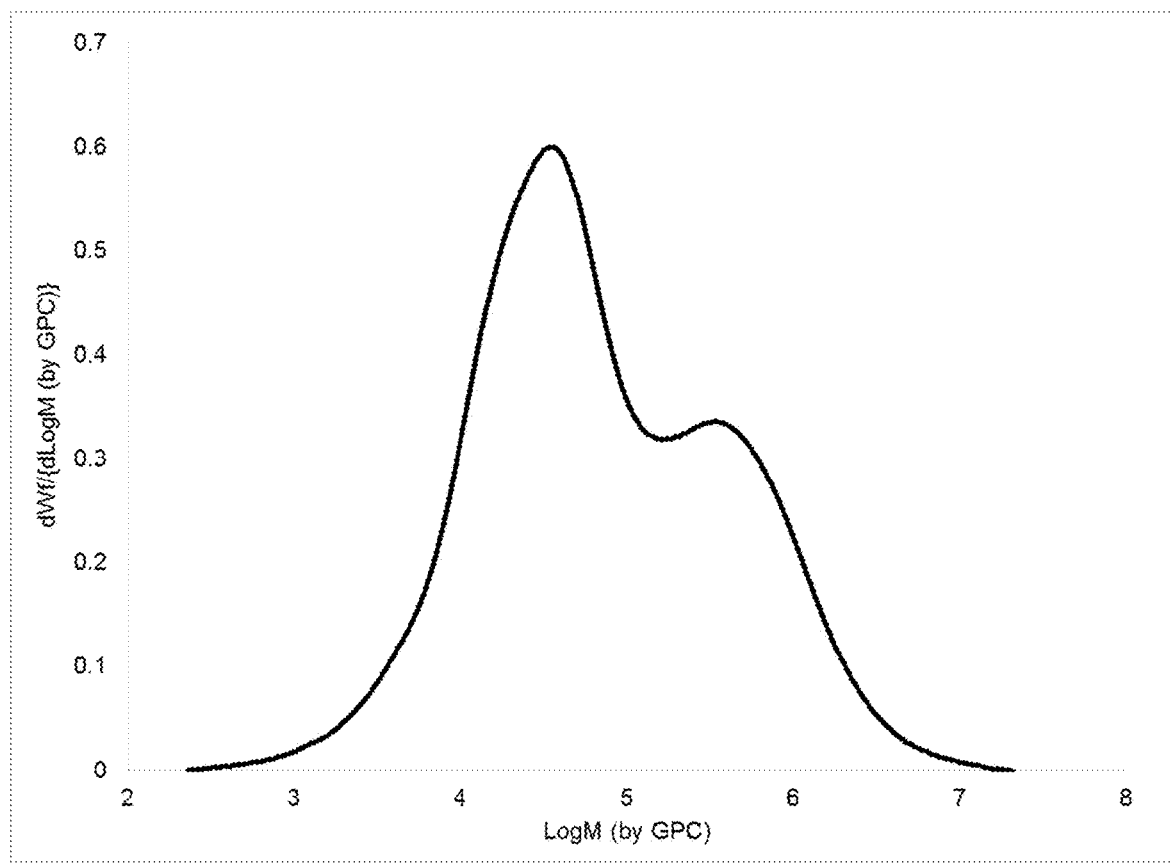
FIG. 1 is a Gel Permeation Chromatogram (GPC) of a bimodal polyethylene composition made according to the method of Inventive Example 9A.

The Summary, Claims, and Abstract are incorporated here by reference. Certain aspects and embodiments are described below and numbered for easy cross-referencing.

Aspect 1. A method of polymerizing an olefin monomer to make a first polyolefin composition comprising a first polyolefin polymer, the method comprising steps (A) to (C): (A) contacting a solution of a first alkane-soluble non-metallocene precatalyst (abbreviated first ASNM Precatalyst) dissolved in an alkane solvent with an activator (e.g., in a mixer device (such as an in-line mixer device or a catalyst mixing tank) or in piping such as by feeding the solution of the first ASNM Precatalyst through a first pipe and feeding the activator (e.g., as a slurry in an alkane solvent) through a second pipe to a junction (e.g., a "Y" or "T" junction) where the first and second pipes merge into one pipe) so as to make a first trim catalyst comprising a first alkane-soluble non-metallocene catalyst (abbreviated first ASNM Catalyst); (B) feeding the first trim catalyst into a polymerization reactor; and (C) polymerizing the olefin monomer with the first trim catalyst in the polymerization reactor; thereby making the first polyolefin composition comprising the first polyolefin polymer; wherein the first ASNM Precatalyst is characterized by solubility in hexanes containing at least 60 weight percent n-hexane ($CH_3(CH_2)_4$ $CH_3$) of at least 0.10 weight percent (wt %), based on total weight of the ASNM Precatalyst and hexanes, as measured using Solubility Test Method (enhanced solubility). In contrast, an insoluble precatalyst has a solubility in hexanes containing at least 60 weight percent n-hexane ($CH_3(CH_2)_4$ $CH_3$) of from 0.00 to 0.099 wt %, based on total weight of the insoluble precatalyst and hexanes, as measured using Solubility Test Method. Step (B) may be conducted after and/or during step (A). Step (C) may be conducted after and/or during step (B). The first trim catalyst is a product of a reaction of the first alkane-soluble non-metallocene precatalyst and the activator. The olefin may be fed into the polymerization reactor one time, intermittently (e.g., periodically), or continuously. The first polyolefin polymer may be removed from the polymerization reactor once, intermittently (e.g., periodically), or continuously. The first polyolefin composition may be unimodal (consisting essentially of the first polyolefin polymer) or multimodal (consisting essentially of the first polyolefin polymer and at least one second polyolefin polymer that is different than the first polyolefin polymer) The first polyolefin polymer may be a higher molecular weight (HMW) polyolefin. In some aspects the method and reactor is free of a metallocene (pre)catalyst. In some aspects the method and reactor further comprises use of a first metallocene (pre)catalyst. A (pre)catalyst means a precatalyst, catalyst, or both. The activator may be an alkylaluminoxane or a trialkylaluminum compound.

Aspect 2. The method of aspect 1 wherein the first trim catalyst comprises a solution of the first ASNM Catalyst dissolved in an alkane solvent, and step (B) comprises feeding the solution into the reactor, the solution being free of a support material (a finely divided solid). The alkane solvent of the feeding step may be the same as or different than the alkane solvent used in the contacting step. When the solvents are different, the method may further comprise a solvent exchanging or replacing step.

Aspect 3. The method of aspect 1 or 2 further comprising steps (a) and (b): (a) contacting, separately from step (A), a first metallocene precatalyst with an activator and, optionally, a support material so as to make a first metallocene catalyst, optionally disposed on and/or in the support material; and (b) feeding, separately from step (B), the first metallocene catalyst, into the polymerization reactor; and wherein step (C) further comprises polymerizing the olefin monomer with the first metallocene catalyst in the polymerization reactor; thereby making a first bimodal polyolefin composition comprising the first polyolefin polymer and a second polyolefin polymer. The second polyolefin polymer is made by the first metallocene catalyst and is different than the first polyolefin polymer, which is made by the trim catalyst. The activator of step (a) may be the same as or different than the activator of step (A). The first metallocene catalyst is a product of a reaction of the first metallocene precatalyst and the activator of step (a). In some aspects the support material is absent, alternatively present in the first trim catalyst. In some aspects the support material is absent, alternatively present in the first metallocene catalyst. The support material independently may be an untreated silica, alternatively a calcined untreated silica, alternatively a hydrophobing agent-treated silica, alternatively a calcined and hydrophobing agent-treated silica. The hydrophobing agent may be dichlorodimethylsilane.

Aspect 4. The method of aspect 3 wherein step (B) comprises feeding the first trim catalyst as a solution of the first ASNM Catalyst dissolved in a first alkane solvent into the polymerization reactor; and the step (b) comprises separately feeding a solution of the first metallocene catalyst dissolved in a second alkane solvent into the polymerization reactor; wherein the first and second alkane solvents are the same or different; and wherein the solutions are free of a support material. Separately feeding means the solutions enter the polymerization reactor via different injector devices at the same time or through a same injector device at different times.

Aspect 5. The method of aspect 3 or 4 further comprising, after the step (C), (D) transitioning the method from the steps (a) and (b) to steps (a1) and (b1), respectively: (a1) contacting a second metallocene precatalyst, which is different than the first metallocene precatalyst, with an activator, and, optionally, a support material so as to make a second metallocene catalyst, which is different than the first metallocene catalyst in structure of at least one cyclopentadienyl ligand, wherein the second metallocene catalyst is free of a support material or is disposed on and/or in the support material; and (b1) decreasing the feeding of the first metallocene catalyst from a steady-state value until the first metallocene catalyst is no longer being fed into the polymerization reactor and independently initiating and increasing feeding of the second metallocene catalyst into the polymerization reactor until the second metallocene catalyst is being fed into the polymerization reactor at a steady-state value; and wherein step (C) further comprises polymerizing the olefin monomer with the second metallocene catalyst in the polymerization reactor; thereby making a second multimodal (e.g., bimodal) polyolefin composition comprising the first polyolefin polymer made by the first trim catalyst and a third polyolefin polymer made by the second metallocene catalyst, wherein the third polyolefin polymer is different than each of the first and second polyolefin polymers. The first bimodal polyolefin composition may be removed from the polymerization reactor during step (D) such that eventually the polymerization reactor no longer contains the first multimodal polyolefin composition and contains only the second multimodal polyolefin composition. Thus, the transitioning comprises a catalyst transitioning feature and a polymer transitioning feature. The activator of step (a1) may be the same as or different than the activator of step (a). The second metallocene catalyst differs structurally from the first metallocene catalyst in structure of a cyclopentadienyl ligand. For example, the first metallocene catalyst may have at least one unsubstituted cyclopentadienyl ligand and the second metallocene catalyst may have two same or different substituted cyclopentadienyl ligands and no unsubstituted cyclopentadienyl ligand. Alternatively, the first metallocene catalyst may have a methylcyclopentadienyl ligand and a butylcyclopentadienyl ligand and the second metallocene catalyst may have a methylcyclopentadienyl ligand and a propylcyclopentadienyl ligand.

Aspect 6. The method of aspect 1 wherein the first trim catalyst further comprises a support material on which the first ASNM Catalyst is disposed.

Aspect 7. A method of polymerizing an olefin monomer to make a first bimodal polyolefin composition comprising a first higher molecular weight (HMW) polyolefin component and a first lower molecular weight (LMW) polyolefin component, the method comprising steps (1) to (5): (1) contacting a solution of a first alkane-soluble non-metallocene precatalyst (first ASNM Precatalyst) dissolved in an alkane solvent with an activator (e.g., in the mixer device or piping) so as to make a first trim catalyst comprising a first alkane-soluble non-metallocene catalyst (first ASNM Catalyst); (2) contacting a first metallocene precatalyst and an additional amount (first additional amount) of the first alkane-soluble non-metallocene precatalyst (a mixture thereof) with an activator and, optionally, a support material (e.g., in the mixer device or piping) so as to make a first bimodal catalyst system comprising a first metallocene catalyst and an additional amount of the first ASNM Catalyst, optionally free of the support material or disposed on and/or in the support material; (3) contacting the first bimodal catalyst system with the first trim catalyst (e.g., in a first mixer device (e.g., a first in-line mixer device) or in first piping) to make a first mixed catalyst system comprising a mixture of the first bimodal catalyst system and the first trim catalyst; (4) feeding the first mixed catalyst system into a polymerization reactor; and (5) polymerizing the olefin monomer with the first mixed catalyst system in the polymerization reactor; thereby making the first HMW polyolefin component and the first LMW polyolefin component of the first bimodal polyolefin composition; wherein the first ASNM Precatalyst is characterized by solubility in hexanes containing at least 60 weight percent n-hexane ($CH_3(CH_2)_4CH_3$) of at least 0.10 weight percent based on total weight of the first ASNM Precatalyst and hexanes, as measured using Solubility Test Method.

Aspect 8. The method of aspect 7 further comprising, after step (5), (6) transitioning the method from steps (2) to (5) to steps (2a) to (5a), respectively: (2a) contacting a second metallocene precatalyst and a second additional amount of the first alkane-soluble non-metallocene precatalyst with an activator and, optionally, a support material (e.g., in a mixer device such as a third catalyst tank or in piping) so as to make a second bimodal catalyst system comprising the second metallocene catalyst and the second additional amount of the first ASNM Catalyst, optionally free of the support material or disposed on and/or in the support material; (3a) contacting the second bimodal catalyst system with the first trim catalyst (e.g., in a second mixer device (e.g., a second in-line mixer device, which may be the same as or different than the first in-line mixer device) or in second piping, which may be the same as or different than the first piping) to make a second mixed catalyst system comprising a mixture of the second bimodal catalyst system and the first trim catalyst; (4a) decreasing the feeding of the first mixed catalyst system from a steady-state value until the first mixed catalyst system is no longer being fed into the polymerization reactor and independently initiating and increasing feeding of the second mixed catalyst system into the polymerization reactor until the second mixed catalyst is being fed into the polymerization reactor at a steady-state value; and (5a) polymerizing the olefin monomer with the second mixed catalyst system in the polymerization reactor; thereby making a second bimodal polyolefin composition comprising the first HMW polyolefin component and a second LMW polyolefin component, which is different than each of the first HMW polyolefin component and the first LMW polyolefin component. The first bimodal polyolefin composition may be removed from the polymerization reactor during step (6) such that eventually the polymerization reactor no longer contains the first bimodal polyolefin composition and contains only the second bimodal polyolefin composition. Thus, the transitioning comprises a catalyst transitioning feature and a polymer transitioning feature.

Aspect 9. The method of any one of aspects 1 to 8 wherein the olefin monomer is any one of (i) to (vii): (i) ethylene; (ii) propylene; (iii) a ($C_4$-$C_{20}$)alpha-olefin, alternatively a ($C_4$-$C_8$)alpha-olefin, alternatively 1-butene, alternatively 1-hexene, alternatively 1-octene; (iv) 1,3-butadiene; (v) a combination of (i) and (ii); (vi) a combination of (i) and (iii); and (vii) a combination of (i), (ii), and (iv); and wherein the first polyolefin polymer or the HMW polyolefin component (as the case may be) respectively comprises any one of (a) to (g): (a) a polyethylene homopolymer; (b) a polypropylene homopolymer; (c) a poly($C_4$-$C_{20}$)alpha-olefin polymer; (d) a polybutadiene polymer; (e) an ethylene-propylene copolymer; (f) a poly(ethylene-co-($C_4$-$C_{20}$)alpha-olefin) copolymer; and (g) an ethylene-propylene-butadiene copolymer. The method may comprise (i) and (a), alternatively (vi) and (f).

Aspect 10. The method of any one of aspects 1 to 9 wherein the first polyolefin polymer or the HMW polyolefin component (as the case may be) has a weight-average molecular weight of at least 110,000 grams per mole (g/mol), alternatively from 130,000 to 1,900,000 g/mol, alternatively from 150,000 to 990,000 g/mol.

Aspect 11. The method of any one of aspects 1 to 10 wherein the polymerizing is a gas phase polymerizing process and the polymerization reactor is a single gas phase polymerization reactor (e.g., a fluidized bed gas phase polymerization reactor). In other aspects the method uses two polymerization reactors, wherein the first HMW polyolefin component is made by the first ASNM Catalyst in a first polymerization reactor and the first LMW polyolefin component is made by the first metallocene catalyst in a second polymerization reactor, or vice versa.

Aspect 12. The method of any one of aspects 1 to 11 further comprising (D1) transitioning from step (B) to step (B1) feeding to the polymerization reactor a second trim catalyst, which is made by contacting a solution of a second alkane-soluble non-metallocene precatalyst (second ASNM Precatalyst) dissolved in an alkane solvent with an activator to make a second alkane-soluble non-metallocene catalyst (second ASNM Catalyst); wherein the second ASNM Precatalyst is different than the first ASNM Precatalyst in structure of at least one non-metallocene ligand and the second ASNM Catalyst is different than the first ASNM Catalyst in structure of the at least one non-metallocene ligand; wherein the second ASNM Precatalyst is characterized by solubility in hexanes containing at least 60 weight percent n-hexane of at least 0.10 weight percent based on total weight of the second ASNM Precatalyst and hexanes, as measured using Solubility Test Method; and wherein the transitioning comprises decreasing the feeding of the first trim catalyst from a steady-state value until the first trim catalyst is no longer being fed into the polymerization reactor and independently initiating and increasing the feeding of the second trim catalyst into the polymerization reactor until the second trim catalyst is being fed into the polymerization reactor at a steady-state value. The trim catalyst transitioning is useful for transitioning from a steady-state polymerization process making a first grade of polyolefin polymer to another steady-state polymerization process making another grade of polyolefin polymer. The second ASNM Precatalyst differs from the first ASNM Precatalyst in structure of at least one non-metallocene ligand. For example, the first ASNM Precatalyst may have a ligand of formula (1) described later and the second ASNM Precatalyst may have a biphenyl phenolic ligand described later. Alternatively the first and second ASNM Precatalysts may have different ligands of formula (1) described later.

Aspect 13. The method of any one of aspects 1 to 12 wherein each of the ASNM Precatalyst is independently characterized by solubility in hexanes containing at least 60 weight percent n-hexane ($CH_3(CH_2)_4CH_3$) of from 0.10 to 25 wt %, alternatively from 0.50 wt % to 24 wt %, alternatively from 1.0 wt % to 25 wt %, alternatively from 2.0 wt % to 25 wt %, alternatively from 3.0 wt % to 25 wt %, alternatively from 5.0 wt % to 25 wt %, alternatively from 10.0 wt % to 25 wt %, alternatively from 15 wt % to 25 wt %, alternatively from 20.0 wt % to 25 wt %, alternatively from 0.10 to 20.0 wt %, alternatively from 0.5 wt % to 20.0 wt %, alternatively from 1 wt % to 15 wt %, alternatively from 2 wt % to 15 wt %, alternatively from 3 wt % to 15 wt %, alternatively from 5 wt % to 15 wt %, alternatively from 1.0 wt % to 15 wt %, alternatively from 1.0 wt % to 10.0 wt %, as measured using the Solubility Test Method. Advantageously, the solubility of the ASNM Precatalyst(s) in hexanes containing at least 60 weight percent n-hexane is/are enhanced relative to that of HN5Zr dibenzyl, which has solubility of just 0.03 wt % in hexanes containing at least 60 weight percent n-hexane, measured by the Solubility Test Method.

The catalyst transitioning comprises decreasing a first catalyst feed from a steady-state value to an off (stopped) state and initiating and increasing a second catalyst (different) feed from an off (unstarted) state to a steady-state value. The decreasing and increasing may be independently done continuously or intermittently (e.g., periodically, e.g., stepwise increments); may start at the same time or at different times; may be completed at the same time or different times; and may take the same length of time or different lengths of time. Typically the period of time taken by the decreasing step is at least 50%, alternatively from 79% to 100%, alternatively from 91% to 100% overlapped with the period of time taken by the increasing step. The time when the transitioning period starts is the first of either the start of the decreasing step or the start of the increasing step. The time when the transitioning period ends is the later of either the end of the decreasing step (0 feed) or the end of the increasing step (steady-state feed). A typical transition period may be from 1 to 48 hours, alternatively from 2 to 24 hours, alternatively 3 to 12 hours.

The catalyst transitioning may optionally further comprise changing one or more other process conditions such as reactor temperature, (co)monomer flow rate(s), superficial gas velocity within the reactor, and/or, in continuous reactors (not batch reactors) a rate of removal of polymer product from the reactor.

The catalyst transitioning may be done in a "closed" polymerization reactor, which means the reactor is not shut down or stopped during the transitioning. Shutting down a polymerization reactor usually means opening the reactor, purging hydrocarbons from the opened reactor with a purge gas (e.g., nitrogen gas), emptying polymer and catalyst particles from the purged reactor, and cleaning the emptied reactor. Alternatively or additionally, the catalyst transitioning may be done without introducing into the reactor a catalyst "kill" reagent or polymerization neutralizing reagent.

The catalyst transitioning is useful for transitioning between different grades (first and second grades) of a same polyolefin composition or between different polyolefin polymers (first and second polymers). During the transitioning, an intermediate grade polymer may be made that is different from the starting and transitioned steady-state grades. The intermediate grade polymer may have its own uses or small portions thereof may be melt-blended with other polymers to make useful post-reactor polymer blends.

The method is useful in a solution phase, slurry phase, or gas phase polymerization reaction. The polymerization reactor may be a reactor configured for solution phase polymerization, slurry phase polymerization, or gas phase polymerization of the at least one olefin monomer. The reactors and effective polymerization conditions for solution phase polymerization, slurry phase polymerization, or gas phase polymerization are well known.

In some aspects the method comprises gas phase polymerizing and gas phase polymerization reactor (e.g., a fluidized bed gas phase polymerization reactor) and the olefin monomer comprises ethylene and, optionally, 1-butene, 1-hexene, or 1-octene. In some aspects the method is free of Cr, Ti, Mg, or an unsubstituted or substituted cyclopentadienyl group; alternatively Cr, Ti, and Mg; alternatively an unsubstituted or substituted cyclopentadienyl group.

Alkane-Soluble Non-Metallocene Precatalyst (ASNM Precatalyst)

The alkane-soluble non-metallocene precatalyst (ASNM Precatalyst) may be any compound that lacks an unsubstituted or substituted cyclopentadienyl group; and is characterized by solubility in hexanes containing at least 60 weight percent n-hexane ($CH_3(CH_2)_4CH_3$) of at least 0.10 weight percent based on total weight of the ASNM Precatalyst and hexanes, as measured using Solubility Test Method (enhanced solubility); and is converted by an activator to a catalyst effective for polymerizing olefin monomer. The ASNM precatalyst may include aprotic solvates and solvent-free embodiments thereof. In any one of the foregoing aspects, the ASNM Precatalyst may be any one of those described in the numbered embodiments and Examples that follow.

Figure 4:
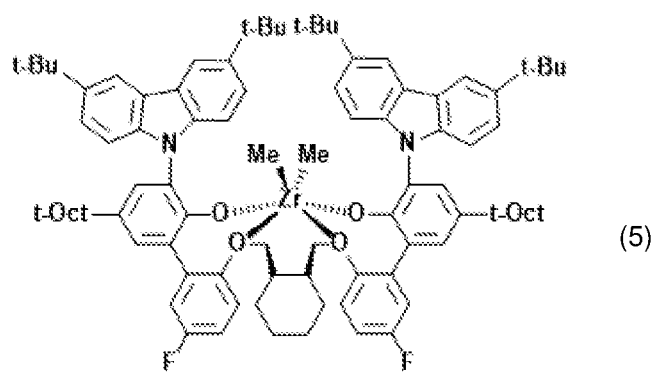
FIG. 4 contains a structural formula of an embodiment of a biphenylphenolic precatalyst as an example of the alkane-soluble non-metallocene precatalyst.

Embodiment 1. The ASNM Precatalyst may be any one of the biphenylphenolic precatalysts described in US20180002464A1, paragraphs [0036] to [0080] and [0104]; alternatively US20180002464A1 paragraph [0080]; alternatively US20180002464A1 paragraph [0104]; alternatively biphenylphenolic precatalyst (5) of FIG. 4. In some aspects the biphenylphenolic precatalyst is a compound characterized by a solubility in hexanes containing at least 60 weight percent n-hexane of from 0.10 to 25 wt %, alternatively from 1 wt % to 20.0 wt %, alternatively from 0.5 wt % to 15 wt %, as measured using the Solubility Test Method.

Embodiment 2. The ASNM Precatalyst may be a compound of formula (1) of FIG. 2, wherein M is a Group 4 metal and each R is independently selected from a silicon-containing organic solubilizing group and a silicon-free organic solubilizing group. The "solubilizing" means together the R groups impart the enhanced solubility to compound (1), which may be written as $HN5MR_2$. In some aspects at least one R is a silicon-containing organic solubilizing group, and the other R is a silicon-containing organic solubilizing group or a silicon-free organic solubilizing group. In some aspects each R independently is the silicon-containing organic solubilizing group. In some aspects each R independently is an unsubstituted or substituted quaternary-silahydrocarbyl group. Each quaternary-silahydrocarbyl group contains a quaternary silicon atom and a ($C_1$-$C_3$)alkylene or ($C_7$-$C_8$)arylalkylene, alternatively ($C_1$-$C_3$)alkylene, alternatively ($C_7$-$C_8$)arylalkylene, alternatively a ($C_1$-$C_2$)hydrocarbylene. The ($C_1$-$C_3$)alkylene or ($C_7$-$C_8$)arylalkylene is disposed between the quaternary silicon atom and the metal M. Thus, the quaternary silicon atom is bonded indirectly to the metal M via the ($C_1$-$C_3$)alkylene or ($C_7$-$C_8$)arylalkylene (e.g., benzylene), which in turn is directly bonded to the metal M (e.g., M-$CH_2$-phenylene-). A quaternary silicon atom is an element having atomic number 14 in the Periodic Table of the Elements that is bonded to four carbon atoms, one of which is a carbon atom of the ($C_1$-$C_3$)alkylene or ($C_7$-$C_8$)arylalkylene. In other aspects each R independently is the silicon-free organic solubilizing group. In some aspects each R group is unsubstituted.

Embodiment 3. The ASNM Precatalyst may be compound (1) of embodiment 2 wherein at least one, alternatively each R independently is an unsubstituted or substituted quaternary-silahydrocarbyl group of formula —$(C(R^4)_2)_m$QZ$R^1R^2R^3$, wherein subscript m is 1, 2, or 3; wherein each $R^4$ independently is H or ($C_1$-$C_3$)alkyl or each $R^4$ is bonded together as $R^{4\prime}$-$R^{4\prime}$, wherein $R^{4\prime}$-$R^{4\prime}$ is a ($C_1$-$C_3$)alkylene; each Q independently is absent, a ($C_1$-$C_3$)alkylene, or an unsubstituted or substituted phenylene; wherein each Z independently is C or Si; wherein each $R^1$, $R^2$, and $R^3$ is independently a ($C_1$-$C_{15}$)alkyl that independently is unsubstituted or substituted with one or more substituents; and wherein each substituent independently is selected from unsubstituted ($C_1$-$C_5$)alkyl, halogen, —Oalkyl, —N(alkyl)$_2$, and —Si(alkyl)$_3$. In some aspects, with the proviso that when subscript m is 2, the resulting $(C(R^4)_2)_m$ is not $C(R^4)_2CH(R^4)$ or $C(R^4)_2CH_2$; and when subscript m is 3, the resulting $(C(R^4)_2)_m$ is not $C(R^4)_2CH(R^4)C(R^4)_2$ or $C(R^4)_2CH_2C(R^4)_2$. The optional proviso is intended to exclude compounds that may be prone to undergoing beta-hydride elimination. In some aspects subscript m is 2, alternatively 1. In some aspects each $R^4$ independently is H or unsubstituted ($C_1$-$C_4$)alkyl, alternatively H or methyl, alternatively H. In some aspects each Q is absent. In some aspects at least one, alternatively each Q is present. When present, each Q independently may be a ($C_1$-$C_3$)alkylene, alternatively $CH_2$, alternatively $CH_2CH_2$, alternatively $CH_2CH_2CH_2$, alternatively $CH_2CH(CH_3)$. Alternatively each Q independently may be unsubstituted 1,4-phenylene, unsubstituted 1,3-phenylene, or unsubstituted 1,2-phenylene; alternatively selected from any two of unsubstituted 1,4-, 1,3-, and 1,2-phenylene; alternatively unsubstituted 1,2-phenylene; alternatively unsubstituted 1,3-phenylene; alternatively unsubstituted 1,4-phenylene. The 1,2-phenylene is benzene-1,2-diyl; the 1,3-phenylene is benzene-1,3-diyl and the 1,4-phenylene is benzene-1,4-diyl. The "unsubstituted phenylene" means the phenylene is of formula $C_6H_4$.

Embodiment 4. The ASNM Precatalyst may be compound (1) of embodiment 2 or 3 wherein at least one, alternatively each R is independently —$CH_2SiR^1R^2R^3$; wherein each $R^1$, $R^2$, and $R^3$ is independently unsubstituted ($C_1$-$C_{15}$)alkyl, alternatively ($C_1$-$C_3$)alkyl, alternatively methyl. In some aspects one R is the —$CH_2SiR^1R^2R^3$ and the other R is unsubstituted ($C_1$-$C_{15}$)alkyl.

Embodiment 5. The ASNM Precatalyst may be compound (1) of embodiment 2, 3, or 4 wherein at least one, alternatively each R is —$CH_2$-(unsubstituted phenylene)-Z$R^1R^2R^3$; wherein each Z is Si or C; wherein each unsubstituted phenylene is unsubstituted 1,4-phenylene, unsubstituted 1,3-phenylene, or unsubstituted 1,2-phenylene; wherein each $R^1$, $R^2$, and $R^3$ is independently unsubstituted ($C_1$-$C_{15}$)alkyl, alternatively ($C_1$-$C_3$)alkyl, alternatively methyl. In some aspects one R is the —$CH_2SiR^1R^2R^3$ and the other R is a tert-butyl-phenylmethyl. At least one, alternatively each Z may be Si, alternatively C.

Embodiment 6. The ASNM Precatalyst may be compound (1) of embodiment 2 wherein each R independently is $CH_2Si(CH_3)_3$ or $CH_2$-(phenylene)-Si$R^1R^2R^3$; and wherein (i) $R^1$ and $R^2$ are methyl, and $R^3$ is unsubstituted ($C_2$-$C_{15}$) alkyl, alternatively unsubstituted ($C_3$-$C_5$)alkyl, alternatively unsubstituted ($C_6$-$C_{15}$)alkyl; or (ii) each $R^1$, $R^2$, and $R^3$ is methyl.

Embodiment 7. The ASNM Precatalyst may be compound (1) of embodiment 2 wherein one R is $CH_2Si(CH_3)_3$ or $CH_2$-(phenylene)-$SiR^1R^2R^3$; and wherein (i) $R^1$ and $R^2$ are methyl, and $R^3$ is unsubstituted $(C_2-C_{15})$alkyl, alternatively unsubstituted $(C_3-C_5)$alkyl; or (ii) each of $R^1$, $R^2$, and $R^3$ is methyl; and wherein the other R is a quaternary-alkyl substituted $(C_7-C_8)$arylalkyl group or an unsubstituted $(C_1-C_{15})$alkyl group. In some aspects the quaternary alkyl substituted $(C_7-C_8)$arylalkyl group is tert-butyl-phenylmethyl (i.e., 1,1-dimethylethylphenylmethyl), alternatively $CH_2$-(1,4-phenylene)-$C(CH_3)_3$. In other aspects the other R is methyl, 2,2-dimethylpropyl, 2,2-dimethylhexyl, or hexyl, 2-ethylhexyl.

Embodiment 8. The ASNM Precatalyst may be compound (1) of embodiment 6 or 7 wherein the phenylene is (i) unsubstituted 1,4-phenylene; (ii) unsubstituted 1,3-phenylene; or (iii) unsubstituted 1,2-phenylene. The phenylene may be unsubstituted 1,4-phenylene.

Embodiment 9. The ASNM Precatalyst may be compound (1) of any one of embodiments 2 to 8 wherein each R independently may be the same or different and may be selected from: trimethylsilylmethyl, dimethylethylsilylmethyl, dimethyl(n-propyl)silylmethyl, dimethyl(n-butyl)silylmethyl, dimethyl(n-pentyl)silylmethyl, dimethyl(n-hexyl)silylmethyl, dimethyl(n-heptyl)silylmethyl, dimethyl(n-octyl)silylmethyl, dimethyl(n-decyl)silylmethyl, dimethyl(n-dodecyl)silylmethyl, triethylsilylmethyl, methyldiethylsilylmethyl, dimethyl(2-ethylhexyl)silylmethyl, dimethyl(trimethylsilylmethyl)silylmethyl, dimethyl(3,3-dimethylbutyl)silylmethyl, dimethyl(1,1-dimethylethyl)silylmethyl, and dimethyl(2-methylpropyl)silylmethyl.

Embodiment 10. The ASNM Precatalyst is compound (1A) of FIG. 2.

Embodiment 11. Aspects wherein each R independently is the silicon-free organic solubilizing group. The ASNM Precatalyst may be compound (1) of embodiment 2 wherein each R independently is methyl, an unsubstituted $(C_2-C_4)$ alkyl group, an unsubstituted $(C_5-C_{12})$alkyl group (e.g., an unsubstituted $(C_5-C_9)$alkyl group or an unsubstituted $(C_{10}-C_{12})$alkyl group), an unsubstituted or substituted quaternary-arylalkyl group; or both R groups are bonded together to give R'—R', wherein R'—R' is an unsubstituted or substituted (aryl)alkylene. Each R group and R'—R' group of embodiment 11 is free of a cyclopentadienyl group, a silicon atom, a carbon-carbon double bond, and a carbon-carbon triple bond. Each substituent independently may be selected from unsubstituted $(C_1-C_5)$alkyl, halogen, -Oalkyl, and —$N(alkyl)_2$. Each quaternary-arylalkyl group sequentially contains a quaternary alkyl, a phenylene, and a $(C_1-C_3)$ alkylene linker. The quaternary alkyl is bonded to the phenylene, which is bonded to the $(C_1-C_3)$alkylene linker, which is bonded to the metal M. The $(C_1-C_3)$alkylene linker and R'—R' groups are divalent. The quaternary alkyl contains a quaternary carbon atom, which may be directly or indirectly bonded to the phenylene. A quaternary carbon atom is an element having atomic number 6 in the Periodic Table of the Elements that is bonded to four other carbon atoms.

Embodiment 12. The ASNM Precatalyst may be compound (1) of embodiment 11 wherein each R independently is methyl, an unsubstituted $(C_2-C_4)$alkyl group, or an unsubstituted $(C_5-C_{12})$alkyl group (e.g., an unsubstituted $(C_5-C_9)$ alkyl group). In some aspects each R is methyl, alternatively each R is an unsubstituted $(C_2-C_4)$alkyl group, alternatively each R is an unsubstituted $(C_5-C_9)$alkyl group, alternatively one R is methyl and the other R is an unsubstituted $(C_5-C_9)$ alkyl group. In some aspects the unsubstituted $(C_5-C_9)$alkyl group is 2,2-dimethylpropyl (neopentyl).

Embodiment 13. The ASNM Precatalyst may be compound (1) of embodiment 11 wherein both R groups are bonded together to give R'—R', wherein R'—R' is an unsubstituted or substituted alkylene, alternatively a substituted $(C_4-C_5)$alkylene. In some aspects R'—R' is —$(CH_2)_3C(H)(R^4)CH_2$— or —$CH_2(C(R^4))_2CH_2$—, wherein each $R^4$ independently is an unsubstituted $(C_1-C_5)$alkyl. The R'—R' may be 2,2,3,3-tetramethylbutane-1,4-diyl or 2-(2',2'-dimethylpropyl)-pentane-1,5-diyl.

Embodiment 14. The ASNM Precatalyst may be compound (1) of embodiment 11 wherein both R groups are bonded together to give R'—R', wherein R'—R' is a substituted arylalkylene, alternatively a 4-(unsubstituted $(C_1-C_5)$ alkyl)-1,2-bezenedimethylene. The 4-(unsubstituted $(C_1-C_5)$ alkyl)-1,2-bezenedimethylene is —$CH_2$-[4-(unsubstituted $(C_1-C_5)$alkyl-(1,2-phenylene)]-$CH_2$—. In some aspects the 4-(unsubstituted $(C_1-C_5)$alkyl)-1,2-bezenedimethylene is 4-(2,2-dimethylpropyl)-1,2-benzenedimethylene (i.e., —$CH_2$-[4-($CH_3C(CH_3)_2CH_2$)-(1,2-phenylene)]-$CH_2$—).

Embodiment 15. The ASNM Precatalyst may be compound (1) of any one of embodiments 11 to 14 wherein each R is the same or different and is independently selected from: methyl; 2,2-dimethylpropyl; 2,2-dimethylhexyl; 2,2-dimethyloctyl; 2-ethylhexyl; 2-ethyloctyl; 2-tert-butylphenylmethyl; 3-tert-butylphenylmethyl; 4-tert-butylphenylmethyl; 2-ethylphenylmethyl; 3-n-butylphenylmethyl; 4-n-butylphenylmethyl; 2-n-butylphenylmethyl; 3-ethylphenylmethyl; 4-ethylphenylmethyl; 2-n-octylphenylmethyl; 3-n-octylphenylmethyl; and 4-n-octylphenylmethyl. In some aspects each R is the same.

Embodiment 16. The ASNM Precatalyst is compound (1B), (1C), (1D), or (1E) of FIG. 2. In some aspects compound (1) is any one of compounds (1A) to (1E), alternatively compound (1) is selected from any four of compounds (1A) to (1E); alternatively compound (1) is compound (1B) or (1C); alternatively compound (1) is compound (1D) or (1E); alternatively compound (1) is compound (1A); alternatively compound (1) is compound (1B); alternatively compound (1) is compound (1C); alternatively compound (1) is compound (1D); alternatively compound (1) is compound (1E).

Embodiment 17. The ASNM Precatalyst may be compound (1) of any one of embodiments 2 to 16 wherein M is Zr. In other aspects M is Hf.

Embodiment 18. The ASNM precatalyst of any one of embodiments 1 to 17 characterized by solubility in hexanes containing at least 60 weight percent n-hexane ($CH_3(CH_2)_4CH_3$) of from 0.50 to 24 wt %.

Synthesis of Compound (1)

Figure 3:
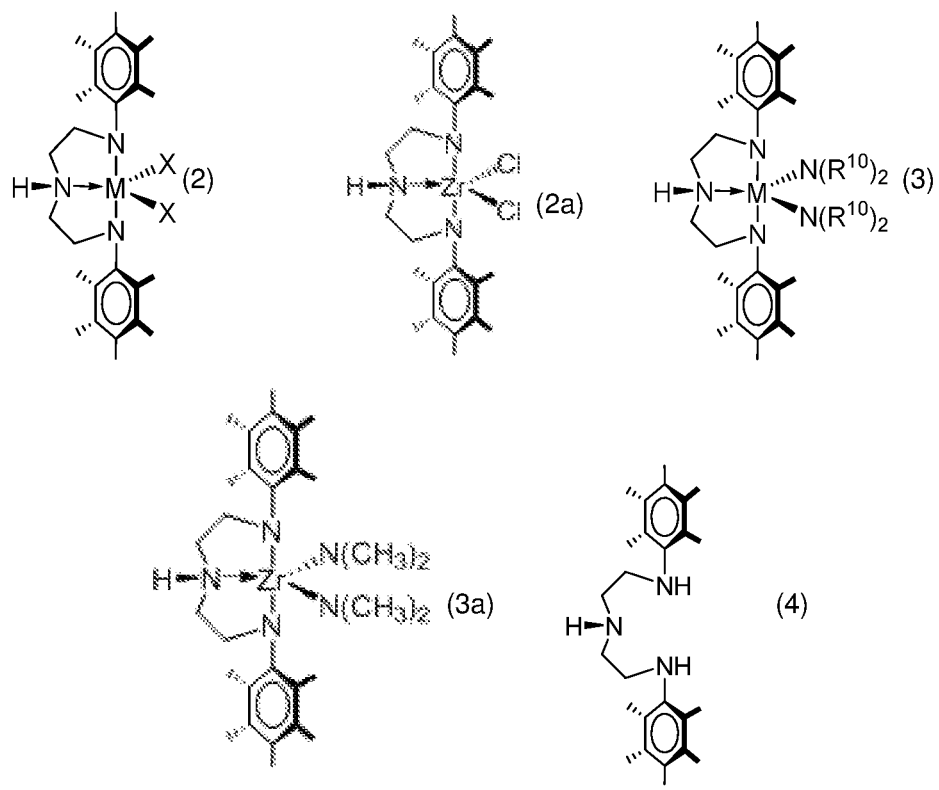
FIG. 3 contains structural formulas of some embodiments of intermediates useful in synthesizing the embodiments of the alkane-soluble non-metallocene precatalysts of FIG. 2.

The compound of formula (1) may be synthesized by contacting a compound of formula (2) of FIG. 3, wherein M is as defined for compound (1) and each X independently is Cl, Br, or I, with an organometallic reagent of formula $X^1MgR$ or $M^1R_n$; wherein R is as defined for compound (1) according to any one of the earlier aspects; $X^1$ is Cl, Br, or I; $M^1$ is selected from Li, Zn, Sn, and Cu; and subscript n is an integer from 1 to 4 and is equal to the formal oxidation state of $M^1$; in an aprotic solvent under effective reaction conditions, thereby synthesizing the compound of formula (1). The molar ratio of compound (2) to the organometallic halide reagent may be from 1:2 to 1:10.

The synthesis of compound (1) may further comprise a preliminary step of contacting a compound of formula (3) of FIG. 3, wherein each $R^{10}$ independently is $(C_1-C_{15})$alkyl, alternatively $(C_1-C_6)$alkyl, with a reagent of formula X—Si $(CH_3)_3$, wherein X is as defined for the compound (2), in an aprotic solvent under effective reaction conditions to synthesize the compound (2).

The synthesis of compound (1) may further comprise a preliminary step of contacting a compound of formula (4) of FIG. 3, with a reagent of formula $M(N(R^{10})_2)_4$, wherein M is as defined for compound (1) and each $R^{10}$ independently is $(C_1-C_{15})$alkyl, in an aprotic solvent under effective reaction conditions to synthesize the compound (3). Each $R^{10}$ independently may be $(C_1-C_6)$alkyl, alternatively methyl or ethyl. The molar ratio of compound (4) to $M(N(R^{10})_2)_4$ may be from 1:10 to 10:1.

The aprotic solvent independently may be a hydrocarbon solvent such as an alkylarene (e.g., toluene, xylene), an alkane, a chlorinated aromatic hydrocarbon (e.g., chlorobenzene), a chlorinated alkane (e.g., dichloromethane), a dialkyl ether (e.g., diethyl ether), or a mixture of any two or more thereof.

The synthesis may be conducted under effective reaction conditions. Effective reaction conditions may comprise techniques for manipulating air-sensitive and/or moisture-sensitive reagents and reactants such as Schlenk-line techniques and an inert gas atmosphere (e.g., nitrogen, helium, or argon). Effective reaction conditions may also comprise a sufficient reaction time, a sufficient reaction temperature, and a sufficient reaction pressure. Each reaction temperature independently may be from −78° to 120° C., alternatively from −30° to 30° C. Each reaction pressure independently may be from 95 to 105 kPa, alternatively from 99 to 103 kPa. Progress of any particular reaction step may be monitored by analytical methods such as nuclear magnetic resonance (NMR) spectroscopy or mass spectrometry. The reaction times independently may be from 30 minutes to 48 hours.

The compound (1) solves the instability problem of prior alkanes-insoluble non-MCN precatalysts because compound (1) may be stored as a solution in alkanes free of activator.

Embodiments of the trim catalyst made from compound (1) and activator have faster light-off than a comparative catalyst system made from HN5Zr dibenzyl and the same activator. And yet compound (1) may make a polyethylene having same MWD as MWD of a polyethylene made by the comparative catalyst system. The faster light-off of the trim catalyst system made from compound (1) and the activator may beneficially result in reduced distributor plate fouling in a gas phase polymerization reactor containing a recycle loop, whereby some polymer particles with active catalyst are entrained back to the reactor where they can grow and foul the distributor plate. The faster light-off of the trim catalyst may be characterized as a shorter time to maximum temperature as measured in vitro using 1-octene as monomer according to the Light-off Test Method, described later.

The trim catalyst (e.g., made from compound (1) and activator) enables making of polyethylene resins having a lesser proportion of particles characterized as "fines", which is defined later. There are many well-known reasons why fines can cause problems in operating a gas phase polymerization reactor having a recycle line and/or an expanded upper section, such as UNIPOL™ reactor from Univation Technologies, LLC or other reactors. Fines are known to lead to an increased tendency for static and sheeting in such reactor. Fines can increase particle carry-over from the reactor into the recycle line and result in fouling inside the recycle loop, such as in a heat exchanger, compressor, and/or distributor plate. Fines can also build up in the reactor's expanded section because, it is believed, fines are more prone and/or susceptible to electrostatic forces. Fines can also cause problems with polyethylene polymers made by gas phase polymerization in such a reactor. Fines may continue to polymerize in cold zones of the reactor, either in the recycle loop or expanded section, and produce a polyethylene having a molecular weight that is higher than that targeted in the bulk fluidized bed. Fines can eventually make their way back from the recycle loop into the fluidized bed, and then into the polyethylene product, leading to higher level of gels in the polyethylene product. The polyethylene resins made by the trim catalyst made from compound (1) and an activator have reduced wt % of fines.

The trim catalyst (e.g., made from compound (1) and activator) enables making of polyethylene resins having larger particle sizes than those of polyethylene resins made by the comparative catalyst system made from the HN5Zr dibenzyl and the same activator. The larger particle sizes of polyethylene resins made by the inventive catalyst system may be useful for decreasing settled bulk densities of the resin. Resins with a higher proportion of fines can have a higher settled bulk density because the smaller particles of the fines can shift downward and fill in spaces between larger particles. If the settled bulk density is too high, the resin can be difficult to fluidize, causing localized overheating and forming resin chunks in certain regions of the reactor process such as near edges of a distributor plate or in a product discharge system.

A polyethylene resin may be made using the bimodal catalyst system, wherein the alkanes solution of the (first or second) ASNM Catalyst is used as trim catalyst (second part) and a combination of all of an MCN precatalyst, activator, and a remainder of the (first or second) ASNM Catalyst are used as the first part, all of a combining-the-parts feed method, may have reduced gel content compared to a polyethylene resin made using the same bimodal catalyst system except wherein a supported HN5Zr dibenzyl is used as trim catalyst and a remainder of HN5Zr dibenzyl and the same MCN precatalyst are used as the first part. Because the (first or second) ASNM Catalyst has significantly greater solubility in hexanes containing at least 60 weight percent n-hexane, than does HN5Zr dibenzyl, the (first or second) ASNM Catalyst may be fed as an alkanes solution (e.g., typically a solution in mineral oil) as a trim catalyst in the "combining-the-parts" feed method described earlier, whereby it can be mixed with the bimodal catalyst system in an in-line mixer to give a trimmed bimodal catalyst system that may make a bimodal polyethylene composition without the increased gel content found for HN5Zr dibenzyl for the reasons described above, and to solve the earlier gel problem.

Hydrocarbon solvent is a liquid material at 25° C. that consists of carbon and hydrogen atoms, and optionally one or more halogen atoms, and is free of carbon-carbon double bonds and carbon-carbon triple bonds. The hydrocarbon solvent may be an alkane, an arene (toluene), or an alkylarene (i.e., arylalkane, xylenes). Examples of hydrocarbon solvents are alkanes such as mineral oil, Isopar-C, Isopar-E, and mineral oil such as white mineral oil, pentanes, hexanes (e.g., hexanes containing at least 60 weight percent n-hexane), heptanes, octanes, nonanes, decanes, undecanes, dodecanes, hexane, 1-methylpentane (isohexane), heptane, 1-methylhexane (isoheptane), octane, nonane, decane; cyclopentane, cyclohexane, cycloheptane, cyclooctane, cyclononane, cyclodecane, methycyclopentane, methylcyclohexane, dimethylcyclopentane, or a mixture of any two or more thereof. Or the method may be free of mineral oil.

Hexanes containing at least 60 weight percent n-hexane is an alkanes mixture consisting essentially of from 60 wt % to 70 wt % n-hexane; from 40 wt % to 10 wt % of one or more compounds of formula $C_6H_{14}$ that is/are not n-hexane; and from 0 wt % to 30 wt % methylcyclopentane. In some aspects the alkanes mixture consists essentially of from 60 wt % to 70 wt % n-hexane; from 40 wt % to 30 wt % of one or more compounds of formula $C_6H_{14}$ that is/are not n-hexane and is free of methylcyclopentane. In other aspects the alkanes mixture consists essentially of from 60 wt % to 70 wt % n-hexane; from less than 40 wt % to 10 wt % of one or more compounds of formula $C_6H_{14}$ that is/are not n-hexane; and from greater than 0 wt % to 30 wt % of methylcyclopentane (e.g., from 20 wt % to 30 wt % methylcyclopentane). Examples of the compounds of formula $C_6H_{14}$ that are not n-hexane are 2-methylpentane, 3-methylpentane, and a mixture thereof. The phrase "consisting essentially of" means free of solvents other than the aforementioned alkanes. The hexanes containing at least 60 weight percent n-hexane may be anhydrous and/or free dissolved of molecular oxygen.

The metallocene precatalyst may be any one of the metallocene catalyst components described in U.S. Pat. No. 7,873,112B2, column 11, line 17, to column 22, line 21. In some aspects the metallocene precatalyst is selected from the metallocene precatalyst species named in U.S. Pat. No. 7,873,112B2, column 18, line 51, to column 22, line 5. In some aspects the metallocene precatalyst is selected from bis($\eta^5$-tetramethylcyclopentadienyl)zirconium dichloride; bis($\eta^5$-tetramethylcyclopentadienyl)zirconium dimethyl; bis($\eta^5$-pentamethylcyclopentadienyl)zirconium dichloride; bis($\eta^5$-pentamethylcyclopentadienyl)zirconium dimethyl; (1,3-dimethyl-4,5,6,7-tetrahydroindenyl)(1-methylcyclopentadienyl)zirconium dimethyl; bis(1-methyl-3-n-butylcyclopentadienyl)zirconium dichloride; bis(1-methyl-3-n-butylcyclopentadienyl)zirconium dimethyl; bis(n-propylcyclopentadienyl)hafnium dichloride; bis(n-propylcyclopentadienyl)hafnium dimethyl; bis(n-butylcyclopentadienyl)zirconium dichloride; and bis(n-butylcyclopentadienyl)zirconium dimethyl. In some aspects the metallocene catalyst is a product of an activation reaction of an activator and any one of the aforementioned metallocene precatalysts.

The ASNM and MCN catalysts may be made under effective activation conditions. Effective activation conditions may comprise techniques for manipulating catalysts such as in-line mixers, catalyst preparation reactors, and polymerization reactors. The activation may be performed in an inert gas atmosphere (e.g., nitrogen, helium, or argon). Effective activation conditions may also comprise a sufficient activation time and a sufficient activation temperature. Each activation temperature independently may be from 20° to 800° C., alternatively from 300° to 650° C. Activation time may be from 10 seconds to 2 hours.

The activator, also known as a cocatalyst, is a compound or a composition comprising a combination of reagents, wherein the compound or composition increases the rate at which a transition metal compound (e.g., compound (1) or metallocene precatalyst) oligomerizes or polymerizes unsaturated monomers, such as olefins, such as ethylene or 1-octene. An activator may also affect the molecular weight, degree of branching, comonomer content, or other properties of the oligomer or polymer (e.g., polyolefin). The transition metal compound (e.g., compound (1) or metallocene precatalyst) may be activated for oligomerization and/or polymerization catalysis in any manner sufficient to allow coordination or cationic oligomerization and or polymerization. Typically, the activator contains aluminum and/or boron, alternatively aluminum. Examples of suitable activators are alkylaluminoxanes and trialkylaluminum compounds.

Aluminoxane (also known as alumoxane) activators may be utilized as an activator for one or more of the precatalyst compositions including compound (1) or metallocene precatalyst. Aluminoxane(s) are generally oligomeric compounds containing —Al(R)—O— subunits, where R is an alkyl group; which are called alkylaluminoxanes (alkylaluminoxanes). The alkylaluminoxane may be unmodified or modified. Examples of alkylaluminoxanes include methylaluminoxane (MAO), modified methylaluminoxane (MMAO), ethylaluminoxane, and isobutylaluminoxane. Unmodified alkylaluminoxanes and modified alkylaluminoxanes are suitable as activators for precatalysts such as compound (1). Mixtures of different aluminoxanes and/or different modified aluminoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and PCT Publication WO 94/10180.

When the activator is an aluminoxane (modified or unmodified), the maximum amount of activator may be selected to be a 5,000-fold molar excess over the precursor based on the molar ratio of moles of Al metal atoms in the aluminoxane to moles of metal atoms M (e.g., Zr or Hf) in the precatalyst (e.g., compound (1)). Alternatively or additionally the minimum amount of activator-to-precatalyst-precursor may be a 1:1 molar ratio (Al/M).

Trialkylaluminum compounds may be utilized as activators for precatalyst (e.g., compound (1) or metallocene precatalyst) or as scavengers to remove residual water from polymerization reactor prior to start-up thereof. Examples of suitable alkylaluminum compounds are trimethylaluminum, triethylaluminum, triisobutylaluminum, tri-n-hexylaluminum, and tri-n-octylaluminum.

The support material is a particulate solid that may be nonporous, semi-porous, or porous. A carrier material is a porous support material. Examples of support materials are talc, inorganic oxides, inorganic chloride, zeolites, clays, resins, and mixtures of any two or more thereof. Examples of suitable resins are polystyrene, functionalized or cross-linked organic supports, such as polystyrene divinyl benzene polyolefins.

Inorganic oxide support materials include Group 2, 3, 4, 5, 13 or 14 metal oxides. The preferred supports include silica, which may or may not be dehydrated, fumed silica, alumina (see, for example, PCT Publication WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in PCT Publication WO 99/47598; aerogels as disclosed in PCT Publication WO 99/48605; spherulites as disclosed in U.S. Pat. No. 5,972,510; and polymeric beads as disclosed in PCT Publication WO 99/50311.

The support material may have a surface area in the range of from about 10 $m^2$/g to about 700 $m^2$/g, a pore volume in the range of from about 0.1 $cm^3$/g to about 4.0 $cm^3$/g, and average particle size in the range of from about 5 microns to about 500 microns. The support material may be a silica (e.g., fumed silica), alumina, a clay, or talc. The fumed silica may be hydrophilic (untreated), alternatively hydrophobic (treated). In some aspects the support is a hydrophobic fumed silica, which may be prepared by treating an untreated fumed silica with a hydrophobing agent such as dimethyldichlorosilane, a polydimethylsiloxane fluid, or hexamethyldisilazane. In some aspects the treating agent is dimethyldichlorosilane. In one embodiment, the support is Cabosil™ TS-610.

One or more precatalysts and/or one or more activators may be deposited on, contacted with, vaporized with, bonded to, or incorporated within, adsorbed or absorbed in, or on, one or more support or carrier materials.

The metallocene precatalyst may be spray dried according to the general methods described in U.S. Pat. No. 5,648,310. The support used with compound (1), and any other precatalysts, may be functionalized, as generally described in EP 0 802 203, or at least one substituent or leaving group is selected as described in U.S. Pat. No. 5,688,880.

Polymerization Reactor and Method

Solution phase polymerization and/or slurry phase polymerization of olefin monomer(s) are well-known. See for example U.S. Pat. No. 8,291,115B2.

Gas-phase polymerization (GPP) is well-known. The polymerization uses a GPP reactor, such as a stirred-bed gas phase polymerization reactor (SB-GPP reactor) or a fluidized-bed gas-phase polymerization reactor (FB-GPP reactor). Such reactors and methods are generally well-known. For example, the FB-GPP reactor/method may be as described in any one of U.S. Pat. Nos. 3,709,853; 4,003,712; 4,011,382; 4,302,566; 4,543,399; 4,882,400; 5,352,749; 5,541,270; US 2018/0079836 A1; EP-A-0 802 202; and Belgian Patent No. 839,380. These SB-GPP and FB-GPP polymerization reactors and processes either mechanically agitate or fluidize by continuous flow of gaseous monomer and diluent the polymerization medium inside the reactor, respectively. Other useful reactors/processes contemplated include series or multistage polymerization processes such as described in U.S. Pat. Nos. 5,627,242; 5,665,818; 5,677,375; EP-A-0 794 200; EP-B1-0 649 992; EP-A-0 802 202; and EP-B-634421

Gas phase polymerization operating conditions are any variable or combination of variables that may affect a polymerization reaction in the GPP reactor or a composition or property of a polyolefin polymer composition product made thereby. The variables may include reactor design and size; precatalyst composition and amount; reactant composition and amount; molar ratio of two different reactants; presence or absence of feed gases such as $H_2$, molar ratio of feed gases versus reactants, absence or concentration of interfering materials (e.g., $H_2O$ and/or $O_2$), absence or presence of an induced condensing agent (ICA), average polymer residence time in the reactor, partial pressures of constituents, feed rates of monomers, reactor bed temperature (e.g., fluidized bed temperature), nature or sequence of process steps, time periods for transitioning between steps. Variables other than that/those being described or changed by the method or use may be kept constant.

In a GPP method, control individual flow rates of ethylene ("$C_2$"), hydrogen ("$H_2$") and 1-hexene ("$C_6$" or "$C_x$" wherein x is 6) to maintain a fixed comonomer to ethylene monomer gas molar ratio ($C_x/C_2$, e.g., $C_6/C_2$) equal to a described value (e.g., 0.00560 or 0.00703), a constant hydrogen to ethylene gas molar ratio ("$H_2/C_2$") equal to a described value (e.g., 0.00229 or 0.00280), and a constant ethylene ("$C_2$") partial pressure equal to a described value (e.g., 1,000 kPa). Measure concentrations of gases by an in-line gas chromatograph to understand and maintain composition in the recycle gas stream. Maintain a reacting bed of growing polymer particles in a fluidized state by continuously flowing a make-up feed and recycle gas through the reaction zone. Use a superficial gas velocity of 0.49 to 0.67 meter per second (m/sec) (1.6 to 2.2 feet per second (ft/sec)). Operate the FB-GPP reactor at a total pressure of about 2344 to about 2413 kilopascals (kPa) (about 340 to about 350 pounds per square inch-gauge (psig)) and at a described first reactor bed temperature RBT. Maintain the fluidized bed at a constant height by withdrawing a portion of the bed at a rate equal to the rate of production of particulate form of the polyolefin polymer composition, which production rate may be from 10 to 20 kilograms per hour (kg/hour). Remove the product polyolefin polymer composition semi-continuously via a series of valves into a fixed volume chamber, wherein this removed bimodal ethylene-co-1-hexene copolymer composition is purged to remove entrained hydrocarbons and treated with a stream of humidified nitrogen ($N_2$) gas to deactivate any trace quantities of residual catalyst.

The catalyst system may be fed into the polymerization reactor(s) in "dry mode" or "wet mode", alternatively dry mode, alternatively wet mode. The dry mode is a dry powder or granules. The wet mode is a suspension in an inert liquid such as mineral oil.

Induced condensing agent (ICA). An inert liquid useful for cooling materials in GPP reactor(s). Its use is optional. The ICA may be a ($C_5$-$C_{20}$)alkane, e.g., 2-methylbutane (i.e., isopentane). See U.S. Pat. Nos. 4,453,399; 4,588,790; 4,994,534; 5,352,749; 5,462,999; and 6,489,408. ICA concentration in reactor may be from 1 to 10 mol %.

The GPP conditions may further include one or more additives such as a chain transfer agent or a promoter. The chain transfer agents are well known and may be alkyl metal such as diethyl zinc. Promoters are known such as in U.S. Pat. No. 4,988,783 and may include chloroform, $CFCl_3$, trichloroethane, and difluorotetrachloroethane. Prior to reactor start up, a scavenging agent may be used to react with moisture and during reactor transitions a scavenging agent may be used to react with excess activator. Scavenging agents may be a trialkylaluminum. GPP may be operated free of (not deliberately added) scavenging agents. The GPP reactor/method may further include an amount (e.g., 0.5 to 200 ppm based on all feeds into reactor) of a static control agent and/or a continuity additive such as aluminum stearate or polyethyleneimine. The static control agent may be added to the FB-GPP reactor to inhibit formation or buildup of static charge therein.

The GPP reactor may be a commercial scale FB-GPP reactor such as a UNIPOL™ reactor or UNIPOL™ II reactor, which are available from Univation Technologies, LLC, a subsidiary of The Dow Chemical Company, Midland, Michigan, USA.

Any compound, composition, formulation, material, mixture, or reaction product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the compound, composition, formulation, material, mixture, or reaction product (e.g., Zr required by a zirconium compound, or C and H required by a polyethylene, or C, H, and O required by an alcohol) are not counted.

Definitions

Alkane (solvent). One or more acyclic compounds of formula $C_nH_{2n+2}$ and/or one or more cyclic compounds of formula $C_mH_{2m}$, wherein subscripts n and m independently are an integer from 5 to 50 (e.g., 6).

Bimodal. Having (only) two maxima in a frequency distribution. Used as bimodal polymer composition or bimodal catalyst system. The bimodal catalyst system contains two different catalysts and makes the bimodal polymer composition, which consists essentially of a higher molecular weight (HMW) component and a lower molecular weight (LMW) component. Bimodal polymer compositions include post-reactor blends (the LMW and HMW components are synthesized in different reactors or in a same reactor at different times separately and later blended together such as by melt extrusion) and reactor blends (the LMW and HMW components are synthesized in the same reactor). The bimodal copolymer composition may be characterized by two peaks separated by a distinguishable local minimum therebetween in a plot of dW/d Log(MW) on the y-axis versus Log(MW) on the x-axis to give a Gel Permeation Chromatograph (GPC) chromatogram, wherein Log(MW) and dW/d Log(MW) are as defined herein and measured by GPC Test Method described herein.

Dry. Generally, a moisture content from 0 to less than 5 parts per million based on total parts by weight. Materials fed to the reactor(s) during a polymerization reaction are dry.

Higher molecular weight (HMW) component. A subgroup of macromolecules having a peak in the GPC plot of dW/d Log(MW) on the y-axis versus Log(MW) on the x-axis that is at a higher molecular weight.

Hydrocarbyl. A monovalent radical formally derived by removing an H atom from a hydrocarbon compound consisting of C and H atoms.

Hydrocarbylene. A divalent radical formally derived by removing two H atoms from a hydrocarbon compound consisting of C and H atoms, wherein the two H atoms are removed from different carbon atoms of the hydrocarbon compound.

Inert. Generally, not (appreciably) reactive or not (appreciably) interfering therewith in the inventive polymerization reaction. The term "inert" as applied to the purge gas or ethylene feed means a molecular oxygen ($O_2$) content from 0 to less than 5 parts per million based on total parts by weight of the purge gas or ethylene feed.

Lower molecular weight (LMW) component. A subgroup of macromolecules having a peak in the GPC plot of dW/d Log(MW) on the y-axis versus Log(MW) on the x-axis that is at a lower molecular weight.

Metallocene catalyst. Homogeneous or heterogeneous material that contains a (substituted or unsubstituted)-cyclopentadienyl ligand-metal complex and enhances olefin polymerization reaction rates. Substantially single site or dual site. Each metal is a transition metal Ti, Zr, or Hf.

Multimodal. Having two or more maxima in a frequency distribution.

Ziegler-Natta catalysts. Heterogeneous materials that enhance olefin polymerization reaction rates and are prepared by contacting inorganic titanium compounds, such as titanium halides supported on a magnesium chloride support, with an activator.

Alternatively precedes a distinct embodiment. ASTM is the standards organization, ASTM International, West Conshohocken, Pennsylvania, USA. Any comparative example is used for illustration purposes only and shall not be prior art. Free of or lacks means a complete absence of; alternatively not detectable. Terms used herein have their IUPAC meanings unless defined otherwise. For example, see Compendium of Chemical Terminology. Gold Book, version 2.3.3, Feb. 24, 2014. IUPAC is International Union of Pure and Applied Chemistry (IUPAC Secretariat, Research Triangle Park, North Carolina, USA). Periodic Table of the Elements is the IUPAC version of May 1, 2018. May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values. Room temperature: 23°±1° C. "HN5" is not pentazole.

EXAMPLES

Isoparaffin fluid: ISOPAR-C from ExxonMobil.
Mineral oil: HYDROBRITE 380 PO White mineral oil from Sonneborn.

Preparation 1A: preparation of an activator formulation comprising spray-dried methylaluminoxane/treated fumed silica (sdMAO) in hexanes/mineral oil. Slurry 1.6 kg of treated fumed silica (CABOSIL TS-610) in 16.8 kg of toluene, then add a 10 wt % solution (11.6 kg) MAO in toluene to give a mixture. Using a spray dryer set at 160° C. and with an outlet temperature at 70° to 80° C., introduce the mixture into an atomizing device of the spray dryer to produce droplets of the mixture, which are then contacted with a hot nitrogen gas stream to evaporate the liquid from the mixture to give a powder. Separate the powder from the gas mixture in a cyclone separator, and discharge the separated powder into a container to give the sdMAO as a fine powder.

Preparation 1B: preparation of a slurry of the activator formulation of Preparation 1A. Slurry the sdMAO powder of Preparation 1A in a mixture of 10 wt % n-hexane and 78 wt % mineral oil to give the activator formulation having 12 wt % sdMAO/treated fumed silica solids in the hexane/mineral oil.

Preparation 2: preparation of a spray-dried metallocene with activator formulation. Replicate Preparations 1A and 1B except prepare an activator formulation by slurrying 1.5 kg of treated fumed silica (CABOSIL TS-610) in 16.8 kg of toluene, followed by adding a 10 wt % solution (11.1 kg) of MAO in toluene and (MeCp)(1,3-dimethyl-4,5,6,7-tetrahydroindenyl)ZrMe$_2$, wherein Me is methyl, Cp is cyclopentadienyl, and MeCp is methylcyclopentadienyl, in an amount sufficient to provide a loading of 40 micromoles Zr per gram of solid. Slurry the resultant powder to give an activator formulation of 22 wt % solids in 10 wt % isoparaffin fluid and 68 wt % mineral oil. Advantageously, the activator formulation does not include a HMW precatalyst, and can be employed to produce polymer compositions with very low ratios of HMW/LMW components. Further, transitions to other catalyst systems are simplified compared to the combining-the-parts feed method of the Introduction.

Preparation 3: synthesis of compound (4) {(HN(CH2CH2NHC6(CH3)5)2)}. Replicate Procedure 2 of U.S. Pat. No. 6,967,184B2, column 33, line 53, to column 34, line 9, to give compound (4), as drawn above.

Preparation 4: synthesis of 4-tert-butylbenzylmagnesium chloride. Under an atmosphere of nitrogen in a glovebox having a freezer component, charge a first oven-dried 120 mL glass jar with three small, PTFE-coated magnetic stir bars and 1.33 g (54.7 mmol) of magnesium turnings. Seal the jar with a PTFE-lined cap, and stir contents vigorously for 40 hours. PTFE is poly(tetrafluoroethylene). Then add 40 mL anhydrous, degassed diethyl ether. Place the jar in the glovebox freezer for 15 minutes to cool the contents of the jar to −30° C. In a second oven-dried 120 mL glass jar, prepare a solution of 4-(1,1,-dimethylethyl)benzyl chloride (2.0 g, 10.9 mmol) in 60 mL of anhydrous, degassed diethyl ether. Seal the jar with a PTFE-lined cap, and place the second glass jar in the glovebox freezer for 15 minutes to cool its contents to −30° C. Add the solution of the second jar to an addition funnel, and add dropwise the contents of the addition funnel to the contents of in the first glass jar over 45 minutes. Use 10 mL of diethyl ether to rinse the residual contents of the addition funnel into the reaction mixture of the first glass jar. Stir the resulting mixture and allow it to come to room temperature for 2.5 hours. Filter the mixture through a PTFE frit into a clean vial to give a solution of 4-tert-butylbenzylmagnesium chloride in diethyl ether. Titrate a portion of the filtrate with iodine/LiCl to determine the concentration of the 4-tert-butylbenzylmagnesium chloride in the solution.

Preparation 5: synthesis of 3-n-butylbenzyl alcohol. Under an atmosphere of nitrogen in a glove box, charge an oven dried round bottom flask with a PTFE-coated magnetic stir bar and a reflux condenser with 3-n-butylbenzoic acid (2.0 g, 11.2 mmol) and 10 mL of dry, degassed THF. Add a solution of borane in tetrahydrofuran (22.4 mL, 22.4 mmol), attach a reflux condenser to the flask, and heat the mixture to reflux for 4 hours. Remove the flask from the glove box, and place under an atmosphere of nitrogen on a Schlenk line, then cool to 0° C. in an ice bath. Slowly add 5 mL of ethanol, then pour the resulting mixture into 30 mL of water, and extract with three 30 mL portions of diethyl ether. Combine and dry the diethyl ether extracts over anhydrous magnesium sulfate, filter through diatomaceous earth, and concentrate under reduced pressure to give a pale orange oil. Dissolve the oil in a minimal amount of hexane, and pass the solution through a plug of silica eluting with a 1:1 volume/volume (v/v) mixture of ethyl acetate and hexane. Concentrate the filtrate under reduced pressure to obtain the 3-n-butylbenzyl alcohol as a pale orange oil. $^1$H NMR (400 MHz, Chloroform-d) δ 7.28-7.23 (m, 1H), 7.19-7.14 (m, 3H), 7.10 (dd, J=7.5, 1.5 Hz, 1H), 4.65 (s, 2H), 2.63-2.55 (m, 2H), 1.64 (d, J=11.9 Hz, 2H), 1.64-1.54 (m, 2H), 1.41-1.28 (m, 2H), 0.91 (t, J=7.3 Hz, 4H). $^{13}$C NMR (101 MHz, Chloroform-d) δ 143.31, 140.76, 128.44, 127.77, 127.08, 124.26, 65.49, 35.60, 33.63, 22.38, 13.94.

Preparation 6: synthesis of 3-n-butylbenzyl chloride. Under an atmosphere of nitrogen on a Schlenk line, charge a 100 mL round bottom flask with n-butylbenzyl alcohol made in Preparation 5 (1.57 g, 9.6 mmol) and add 12 mL of dry degassed dichloromethane. Cool the flask to 0° C. in an ice bath, and add 0.1 mL of triethylamine (0.8 mmol) and add thionyl chloride (1.39 mL, 19.1 mmol) slowly via syringe. Stir the mixture under an atmosphere of nitrogen and allow to come to room temperature over 22 hours. Carefully pour the mixture into 50 mL of ice water and extract with three 30 mL portions of dichloromethane. Wash the combined dichloromethane layers with two 50 mL portions of saturated aqueous sodium bicarbonate and two 50 mL portions saturated aqueous sodium chloride, then dry over magnesium sulfate and concentrate under reduced pressure. The 3-n-butylbenzyl chloride is obtained as a pale yellow liquid. $^1$H NMR (400 MHz, Chloroform-d) δ 7.25 (dd, J=8.3, 7.4 Hz, 1H), 7.21-7.16 (m, 2H), 7.12 (dt, J=7.4, 1.6 Hz, 1H), 4.56 (s, 2H), 2.64-2.56 (m, 2H), 1.65-1.50 (m, 3H), 1.34 (dq, J=14.6, 7.3 Hz, 2H), 0.92 (t, J=7.3 Hz, 3H). $^{13}$C NMR (101 MHz, Chloroform-d) δ 143.51, 137.32, 128.63, 128.59, 128.51, 125.83, 46.43, 35.50, 33.53, 22.37, 13.93.

Preparation 7: synthesis of 3-n-butylbenzylmagnesium chloride. Under an atmosphere of nitrogen in a glovebox having a freezer component, charge a first oven-dried 40 mL glass vial with three small, PTFE-coated magnetic stir bars and 330 mg (13.7 mmol) of magnesium turnings. Seal the vial with a PTFE-lined septum cap, and stir contents vigorously for 40 hours. Then add 10 mL anhydrous, degassed diethyl ether. Place the jar in the glovebox freezer for 15 minutes to cool the contents of the jar to −30° C. In a second oven-dried 40 mL glass vial, prepare a solution of 3-(n-butyl)benzyl chloride of Preparation 6 (0.5 g, 10.9 mmol) in 15 mL of anhydrous, degassed diethyl ether. Seal the jar with a PTFE-lined septum cap, and place the second glass vial in the glovebox freezer for 15 minutes to cool its contents to −30° C. Add the solution of the second jar to an addition funnel, and add dropwise the contents of the addition funnel to the contents of in the first glass jar over 10 minutes. Use 2 mL of diethyl ether to rinse the residual contents of the addition funnel into the reaction mixture of the first glass jar. Stir the resulting mixture and allow it to come to room temperature for 1.5 hours. Filter the mixture through a PTFE frit into a clean vial to give a solution of 3-n-butylbenzylmagnesium chloride in diethyl ether. Titrate a portion of the filtrate with iodine/LiCl to determine the concentration of the 3-n-butylbenzylmagnesium chloride in the solution.

Preparation 8: synthesis of tetra(3-methylbenzyl)zirconium. Under an atmosphere of nitrogen in a glovebox having a freezer component, charge a 40 mL oven-dried vial with a PTFE-coated stir bar with zirconium(IV) chloride (0.25 g, 0.6 mmol) and 10 mL of toluene. Seal the vial with a PTFE-lined septum cap and place the vial in the glovebox freezer for 15 minutes to cool the contents of the jar to −30° C. Slowly add a solution of 3-methylbenzylmagnesium chloride (7.35 mL, 2.6 mmol) of Preparation 7, then cover the vial with aluminum foil and stir the mixture while allowing to come to room temperature in the dark for 16 hours. Add 15 mL of diethyl ether and filter the mixture through diatomaceous earth, then concentrate the mixture to a volume of about 2 mL. Add a 10 mL portion of pentane place the vial in the glovebox freezer overnight. Collect the resulting yellow precipitate by filtration then triturate the resulting solid in 5 mL of hexane and dry under vacuum three times to remove the residual THF. Add 5 mL of toluene to the resulting solid and filter through a 0.45 μM PTFE syringe filter. Concentrate the filtrate under reduced pressure, then triturate in 5 mL of hexane and dry under vacuum three times. Add 5 mL of pentane and place the vial in the glove box freezer for 72 hours. Filter the mixture through diatomaceous earth and wash the filter cake with 10 mL of hexane. Concentrate the filtrate under reduced pressure to give the tetra(3-methylbenzyl)zirconium as a yellow-brown oil. $^1$H NMR (400 MHz, Benzene-d$_6$) δ 7.03 (t, J=7.6 Hz, 1H), 6.82 (ddt, J=7.5, 1.8, 0.9 Hz, 1H), 6.34 (dt, J=8.0, 1.4 Hz, 1H), 6.11 (d, J=1.9 Hz, 1H), 2.06 (s, 3H), 1.52 (s, 2H). $^{13}$C NMR (101 MHz, Benzene-d$_6$) δ 140.90, 140.02, 130.97, 128.68, 125.92, 124.99, 71.42, 21.68.

Bimodality Test Method: determine presence or absence of resolved bimodality by plotting dWf/d Log M (mass detector response) on y-axis versus Log M on the x-axis to obtain a GPC chromatogram curve containing local maxima log(MW) values for LMW and HMW polyethylene component peaks, and observing the presence or absence of a local minimum between the LMW and HMW polyethylene component peaks. The dWf is change in weight fraction, d Log M is also referred to as d Log(MW) and is change in logarithm of molecular weight, and Log M is also referred to as Log(MW) and is logarithm of molecular weight.

Deconvoluting Test Method: segment the chromatogram obtained using the Bimodality Test Method into nine (9) Schulz-Flory molecular weight distributions. Such deconvolution method is described in U.S. Pat. No. 6,534,604. Assign the lowest four MW distributions to the LMW polyethylene component and the five highest MW distributions to the HMW polyethylene component. Determine the respective weight percents (wt %) for each of the LMW and HMW polyethylene components in the bimodal ethylene-co-1-hexene copolymer composition by using summed values of the weight fractions (Wf) of the LMW and HMW polyethylene components and the respective number average molecular weights ($M_n$) and weight average molecular weights ($M_w$) by known mathematical treatment of aggregated Schulz-Flory MW distributions.

Density is measured according to ASTM D792-13, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Gel permeation chromatography (GPC) Test Method: Weight-Average Molecular Weight Test Method: determine $M_w$, number-average molecular weight ($M_n$), and $M_w/M_n$ using chromatograms obtained on a High Temperature Gel Permeation Chromatography instrument (HTGPC, Polymer Laboratories). The HTGPC is equipped with transfer lines, a differential refractive index detector (DRI), and three Polymer Laboratories PLgel 10 μm Mixed-B columns, all contained in an oven maintained at 160° C. Method uses a solvent composed of BHT-treated TCB at nominal flow rate of 1.0 milliliter per minute (mL/min.) and a nominal injection volume of 300 microliters (μL). Prepare the solvent by dissolving 6 grams of butylated hydroxytoluene (BHT, antioxidant) in 4 liters (L) of reagent grade 1,2,4-trichlorobenzene (TCB), and filtering the resulting solution through a 0.1 micrometer (μm) PTFE filter to give the solvent. PTFE is poly(tetrafluoroethylene). Degas the solvent with an inline degasser before it enters the HTGPC instrument. Calibrate the columns with a series of monodispersed polystyrene (PS) standards. Separately, prepare known concentrations of test polymer dissolved in solvent by heating known amounts thereof in known volumes of solvent at 160° C. with continuous shaking for 2 hours to give solutions. (Measure all quantities gravimetrically.) Target solution concentrations, c, of test polymer of from 0.5 to 2.0 milligrams polymer per milliliter solution (mg/mL), with lower concentrations, c, being used for higher molecular weight polymers. Prior to running each sample, purge the DRI detector. Then increase flow rate in the apparatus to 1.0 mL/min/, and allow the DRI detector to stabilize for 8 hours before injecting the first sample. Calculate $M_w$ and $M_n$ using universal calibration relationships with the column calibrations. Calculate MW at each elution volume with following equation:

$$\log M_X = \frac{\log(K_X/K_{PS})}{a_X + 1} + \frac{a_{PS} + 1}{a_X + 1} \log M_{PS},$$

where subscript "X" stands for the test sample, subscript "PS" stands for PS standards, $a_{PS}$=0.67, $K_{PS}$=0.000175, and $a_X$ and $K_X$ are obtained from published literature. For polyethylenes, $a_X/K_X$=0.695/0.000579. For polypropylenes $a_X/K_X$=0.705/0.0002288. At each point in the resulting chromatogram, calculate concentration, c, from a baseline-subtracted DRI signal, $I_{DRI}$, using the following equation: c=$K_{DRI}I_{DRI}$/(dn/dc), wherein $K_{DRI}$ is a constant determined by calibrating the DRI, / indicates division, and dn/dc is the refractive index increment for the polymer. For polyethylene, dn/dc=0.109. Calculate mass recovery of polymer from the ratio of the integrated area of the chromatogram of concentration chromatography over elution volume and the injection mass which is equal to the pre-determined concentration multiplied by injection loop volume. Report all molecular weights in grams per mole (g/mol) unless otherwise noted. Further details regarding methods of determining Mw, Mn, MWD are described in US 2006/0173123 page 24-25, paragraphs [0334] to [0341]. Plot of dW/d Log(MW) on the y-axis versus Log(MW) on the x-axis to give a GPC chromatogram, wherein Log(MW) and dW/d Log(MW) are as defined above.

High Load Melt Index (HLMI) $I_{21}$ Test Method: use ASTM D1238-13, *Standard Test Method for Melt Flow Rates of Thermoplastics by Extrusion Platometer*, using conditions of 190° C./21.6 kilograms (kg). Results are in units of grams eluted per 10 minutes (g/10 min.).

Light-off Test Method: Under an atmosphere of nitrogen in a glovebox, charge a 40 mL glass vial with a PTFE-coated, magnetic stir bar and 0.16 g of spray dried methylaluminoxane powder of Preparation 1A. To the charged vial add 11 mL of 1-octene, and then insert the vial into an insulated sleeve mounted on a magnetic stir plate turning at approximately 300 rotations per minute (rpm). To the insulated vial add 8 micromoles (μmol) of precatalyst (e.g., compound (1) or HN5Zr dibenzyl). Cap the vial with a rubber septum. Insert a thermocouple probe through the rubber septum into the vial such that the tip of the thermocouple probe is below the liquid level. Record the temperature of the contents of the vial at 5 second intervals, continuing until after the maximum temperature is reached. Download the temperature and time data to a spreadsheet, and plot thermo-kinetic profiles for analysis.

Melt Index $I_5$ ("$I_5$") Test Method: use ASTM D1238-13, using conditions of 190° C./5.0 kg. Report results in units of grams eluted per 10 minutes (g/10 min.).

Melt Flow Ratio MFR5: ("$I_{21}/I_5$") Test Method: calculated by dividing the value from the HLMI $I_{21}$ Test Method by the value from the Melt Index $I_5$ Test Method.

Solubility Test Method: to a 20-mL vial is added, at room temperature and ambient pressure, a known mass of test precatalyst (e.g., compound (1)) and a known volume of hexanes containing at least 60 weight percent n-hexane. A PTFE-coated magnetic stir bar is added and the mixture is allowed to stir for 1 hour before the vial is removed from the stir plate, and the mixture is allowed to sit overnight. The next day the suspension is filtered through a 0.4 μm PTFE syringe filter into a tared vial, giving a known mass of supernatant, and the hexanes are removed under reduced pressure, leaving a measurable mass of the compound of formula (1) from which wt. % solubility is calculated.

Inventive Example 1 (IE1): synthesis of compound (3a) of FIG. 3 (compound (3) wherein each $R^{10}$ is methyl) from compound (4) of FIG. 3, which is prepared according to Preparation 3. Under a nitrogen atmosphere in a glovebox, charge an oven-dried 400 mL glass jar with a PTFE-coated magnetic stir bar, compound (4) (10 g, 25.3 mmol), and 200 mL of dry, degassed n-pentane. Then add tetrakis(dimethylamino)zirconium(IV) (6.76 g, 25.3 mmol) as a solid in small portions, then stir the resulting reaction mixture at 25° C. for 16 hours. Cool the mixture in a freezer in the glove box for 1 hour to precipitate compound (3a). Filter off precipitated (3a), and wash the filtercake with cold n-pentane. Dry the washed compound (3a) under reduced pressure to give 12.62 g (87.1% yield) of compound (3a) as a white powder. $^1$H NMR (400 MHz, Benzene-$d_6$) δ 3.37 (dt, 2H), 3.10 (d, 6H), 3.02 (dd, 3H), 2.68 (dq, 4H), 2.51 (d, 12H), 2.20 (q, 18H), 2.14 (s, 7H), 1.84 (s, 1H); $^{13}$C NMR (101 MHz, Benzene-$d_6$) δ 149.77, 132.34, 132.14, 130.04, 129.98, 129.32, 56.29, 48.86, 44.35, 40.91, 17.31, 17.27, 16.72, 16.65, 16.09.

Inventive Example 2 (IE2): synthesis of compound (2a) of FIG. 3 (compound (2) wherein M is Zr and each X is Cl) from compound (3a) of FIG. 3. Under a nitrogen atmosphere in a glovebox, charged an oven-dried 400 mL glass jar with a PTFE-coated, magnetic stir bar, compound (3a) (12.62 g, 22.0 mmol), and 250 mL of dry, degassed diethyl ether. Add chlorotrimethylsilane (6.2 mL, 48.5 mmol), and stir the mixture at 25° C. for 24 hours. Cool the mixture in the glove box freezer for 1 hour to precipitate compound (2a). Collect precipitated (2a) by filtration, and wash the filtercake with cold n-pentane. Dry the washed (2a) under reduced pressure to give 10.77 g (88.0% yield) of compound (2a), i.e., bis(2-(pentamethylphenylamido)ethyl)-amine zirconium (IV) dichloride, as a white powder. $^1$H NMR (400 MHz, Benzene-$d_6$) δ 3.40 (dt, 1H), 2.95 (dt, 1H), 2.59 (dp, 2H), 2.49 (s, 3H), 2.46 (s, 3H), 2.43-2.34 (m, 1H), 2.13 (s, 3H), 2.06 (s, 3H), 2.04 (s, 3H). $^{13}$C NMR (101 MHz, Benzene-$d_6$) δ 145.64, 133.37, 133.20, 132.61, 129.84, 129.57, 57.69, 48.97, 17.03, 17.01, 16.70, 16.47.

Figure 2:
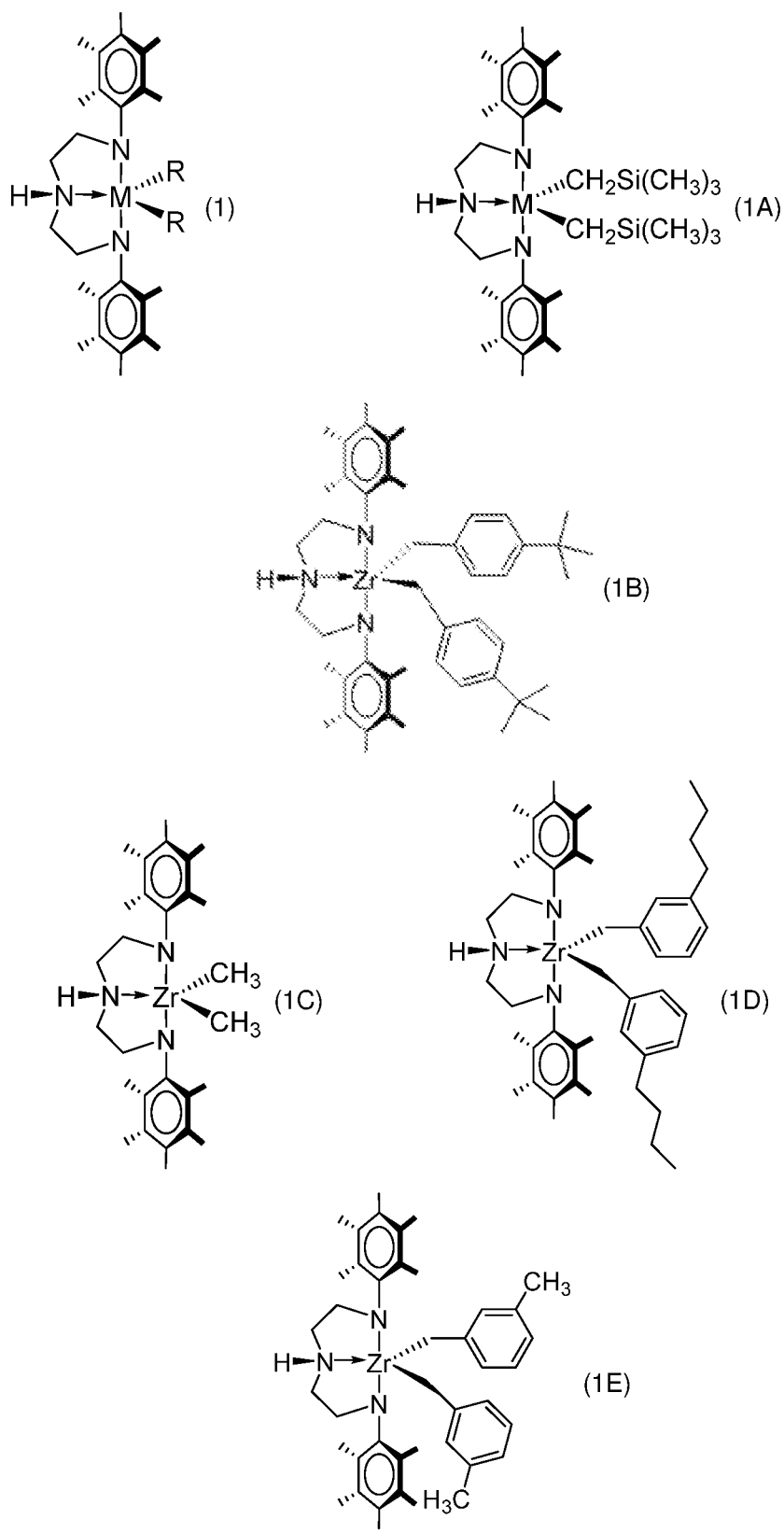
FIG. 2 contains structural formulas of some embodiments of the alkane-soluble non-metallocene precatalyst.

Inventive Example 3 (IE3): synthesis of compound (1A) of FIG. 2 (compound (1) wherein M is Zr and each R is $CH_2Si(CH_3)_3$) from compound (2a) of FIG. 3. Under a nitrogen atmosphere in a glovebox, charge an oven-dried 400 mL glass jar with a PTFE-coated, magnetic stir bar, compound (2a) (5.0 g, 9.0 mmol), and 250 mL of dry, degassed toluene. Add a 1.0 M solution of trimethylsilylmethylmagnesium chloride in hexane, and stir the reaction mixture at 25° C. for 23 hours. Quench the reaction mixture with 2 mL of 1,4-dioxane, then filter the quenched mixture through diatomaceous earth. Concentrate the filtrate under reduced pressure. Triturate the residue concentrate in 20 mL of hexane, and dry the remaining triturated material under reduced pressure. Repeat the trituration/drying two times. Slurry the resulting pale orange solid in 200 mL of hexane, and place the slurry in the glove box freezer for several hours. Filter off the resulting fine precipitate through diatomaceous earth, then concentrate the filtrate under reduced pressure, and dry under vacuum to give compound (1A) as a pale orange powder. Compound (1A) is bis(2-(pentamethylphenylamido)ethyl)-amine zirconium(IV) bis-trimethylsilylmethyl. Repeat the procedure of IE3 two times to give a combined 14.2 g (average yield 79.8% over three runs) of compound (1A). $^1$H NMR (400 MHz, Benzene-$d_6$) δ 3.38 (dt, J=12.6, 5.4 Hz, 2H), 3.14 (ddd, J=12.3, 6.7, 5.3 Hz, 2H), 2.69-2.62 (m, 3H), 2.60 (s, 8H), 2.44 (s, 6H), 2.22 (s, 6H), 2.17 (s, 6H), 2.10 (s, 7H), 1.25-1.19 (m, 1H), 0.42-0.38 (m, 2H), 0.24 (s, 9H), -0.12 (s, 2H), -0.28 (s, 9H). $^{13}$C NMR (101 MHz, Benzene-$d_6$) δ 147.18, 133.07, 132.73, 130.97, 129.74, 129.67, 57.49, 55.96, 54.74, 48.29, 16.80, 16.70, 16.67, 16.37, 16.23, 3.40, 2.02. Measure the light-off performance according to the Light-Off Test Method and measure the according to the Solubility Test Method. Solubility and time to maximum temperature results are reported later in Table 1.

Inventive Example 4 (IE4): synthesis of compound (1B) of FIG. 2 (compound (1) wherein M is Zr and each R is $CH_2$-(1,4-phenylene)-$C(CH_3)_3$) from compound (2a) of FIG. 3. Charge a clean oven dried jar with a PTFE-coated magnetic stir bar, the compound (2a) (1.5 g, 2.69 mmol), and 100 mL of dry, degassed toluene to make a solution of compound (2a) in toluene. Place the jar in a glovebox freezer along with a separate bottle containing the solution of 4-tert-butylbenzylmagnesium chloride of Preparation 4 for 15 minutes to cool to -30° C. Then add the solution of 4-tert-butylbenzylmagnesium chloride to an addition funnel, and add the contents of the addition funnel dropwise to the solution of the compound (2a). Stir the mixture and allow it to come to room temperature (r.t.) over 1 hour. Then add 0.5 mL of 1,4-dioxane, and filter the resulting mixture through diatomaceous earth. Concentrate the filtrate under reduced pressure, and take up the resulting residue in 30 mL of toluene. Again filter through and concentrate under reduced pressure to give a twice filtered/concentrated residue. Triturate the residue with three 10 mL portions of hexane, and dry the triturated residue under reduced pressure to ensure complete removal of toluene. Add 20 mL of pentane to the residue, and place the resulting mixture in the glovebox freezer for 72 hours to give a yellow precipitate, which is collected by filtration through a chilled PTFE frit and dried under reduced pressure to give 0.95 g of compound (1B) (45% yield). $^1$H NMR (400 MHz, Benzene-$d_6$) δ 7.31-7.23 (m, 2H), 7.18-7.07 (m, 4H), 5.73-5.66 (m, 2H), 3.45 (dt, J=11.8, 5.5 Hz, 2H), 3.25 (dd, J=9.8, 4.5 Hz, 1H), 3.15 (dt, J=12.0, 5.7 Hz, 2H), 2.76-2.65 (m, 2H), 2.49 (d, J=4.4 Hz, 13H), 2.28 (s, 6H), 2.14 (d, J=18.8 Hz, 11H), 1.77 (s, 2H), 1.33 (s, 8H), 1.21 (s, 8H), 0.87 (s, 2H). $^{13}$C NMR (101 MHz, Benzene-$d_6$) δ 152.70, 148.52, 147.67, 142.21, 136.97, 133.69, 132.32, 131.19, 130.57, 130.41, 129.41, 126.93, 125.50, 124.38, 63.41, 58.04, 53.38, 49.37, 34.13, 34.08, 31.90, 31.88, 17.18, 17.14, 17.06, 16.68, 16.61. Measure the light-off performance according to the Light-Off Test Method and measure the according to the Solubility Test Method. Solubility and time to maximum temperature results are reported later in Table 1.

Inventive Example 5 (IE5): synthesis of compound (1C) of FIG. 2 (compound (1) wherein M is Zr and each R is $CH_3$) from compound (2a) of FIG. 3. Under an atmosphere of nitrogen in a glovebox, charged an oven-dried 100 mL glass jar with a PTFE-coated magnetic stir bar, compound (2a) (0.5 g, 0.9 mmol), and 25 mL of dry, degassed dichloromethane. Placed the mixture in the glove box freezer for 1 hour to cool to -30° C. Slowly added a 3.0 M solution of methylmagnesium bromide in diethyl ether (0.6 mL, 1.8 mmol) with stirring, then allowed the mixture to warm to room temperature with stirring for 30 minutes. Quenched the mixture with 0.2 mL of 1,4-dioxane, then filtered it through PTFE, and concentrated the filtrate under reduced pressure. Triturated the residue in 20 mL of n-pentane, and filtered the resulting solid. Dried the solid under reduced pressure to give 0.32 g (69% yield) of compound (1B) as a pale orange powder. $^1$H NMR (400 MHz, Benzene-$d_6$) δ 3.40 (ddd, J=12.3, 8.9, 5.5 Hz, 3H), 3.11 (ddd, J=12.3, 5.2, 3.3 Hz, 2H), 2.51 (s, 7H), 2.49 (s, 7H), 2.47-2.42 (m, 5H), 2.21 (s, 6H), 2.18 (s, 7H), 2.11 (s, 7H), 0.17 (s, 3H), 0.07 (s, 3H). Measure the light-off performance according to the Light-Off Test Method and measure the according to the Solubility Test Method. Solubility and time to maximum temperature results are reported later in Table 1.

Inventive Example 5A (IE5A): synthesis of compound (1D) (compound (1) wherein M is Zr and each R is CH$_2$-(1,3-phenylene)-CH$_2$CH$_2$CH$_2$CH$_3$) from compound (2a)

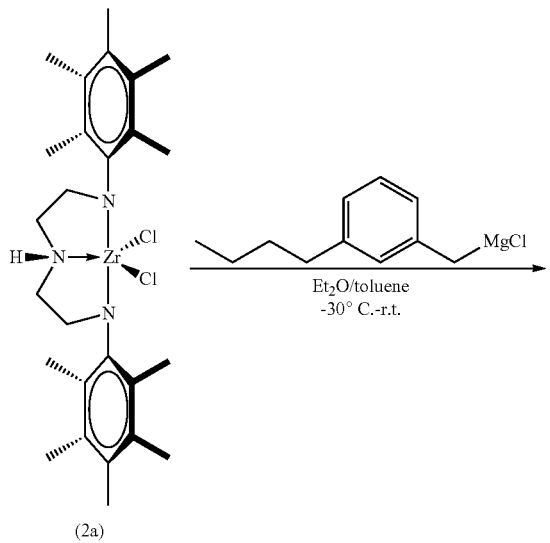

(2a)

Charge a clean oven dried jar with a PTFE-coated magnetic stir bar with the compound (2a) (0.4 g, 0.7 mmol), and 20 mL of dry, degassed toluene to make a solution of compound (2a) in toluene. Place the jar in a glovebox freezer along with a separate bottle containing the solution of 3-n-butylbenzylmagnesium chloride of Preparation 7 for 15 minutes to cool to −30° C. Then add the solution of 3-n-butylbenzylmagnesium chloride to an addition funnel, and add the contents of the addition funnel dropwise to the solution of the compound (2a). Stir the mixture and allow it to come to room temperature (r.t.) over 16 hours. Then add 20 mL of diethyl ether, and filter the resulting mixture through diatomaceous earth. Concentrate the filtrate under reduced pressure, and take up the resulting residue in 30 mL of toluene. Again filter through diatomaceous earth and concentrate under reduced pressure to give a twice filtered/concentrated residue. Triturate the residue with three 10 mL portions of hexane, and dry the triturated residue under reduced pressure to ensure complete removal of toluene. Add 20 mL of pentane to the residue, and place the resulting mixture in the glovebox freezer for 72 hours to give a yellow precipitate, which is collected by filtration through a chilled PTFE frit and dried under reduced pressure to give 0.12 g of compound (1D) (22% yield). $^1$H NMR (400 MHz, Benzene-d$_6$) δ 7.21 (t, J=7.4 Hz, 1H), 7.08-7.01 (m, 2H), 6.88 (t, J=7.5 Hz, 1H), 6.81 (dt, J=7.6, 1.4 Hz, 1H), 6.76-6.71 (m, 1H), 5.58-5.51 (m, 2H), 3.48 (dt, J=11.8, 5.6 Hz, 2H), 3.34 (s, 1H), 3.19 (dt, J=12.1, 5.8 Hz, 2H), 2.73 (dq, J=12.2, 6.0 Hz, 3H), 2.61 (td, J=7.5, 6.9, 4.0 Hz, 5H), 2.48 (d, J=5.8 Hz, 10H), 2.27 (s, 6H), 2.15 (s, 7H), 2.11 (s, 7H), 1.83 (s, 2H), 1.72-1.61 (m, 3H), 1.44-1.35 (m, 3H), 1.31 (dd, J=14.8, 7.4 Hz, 3H), 0.93 (s, 2H), 0.93-0.86 (m, 3H). $^{13}$C NMR (101 MHz, Benzene-d$_6$) δ 147.35, 146.46, 142.43, 133.37, 132.09, 131.93, 130.96, 130.25, 130.11, 124.83, 123.77, 121.68, 119.94, 63.63, 57.68, 53.33, 49.12, 36.11, 36.07, 32.67, 22.32, 16.82, 16.78, 16.70, 16.35, 16.29, 13.79. Measure the light-off performance according to the Light-Off Test Method and measure the according to the Solubility Test Method. Solubility and time to maximum temperature results are reported later in Table 1.

Inventive Example 5B (IE5B): synthesis of compound (1E) (compound (1) wherein M is Zr and each R is CH$_2$-(1,3-phenylene)-CH$_3$) from compound (4)

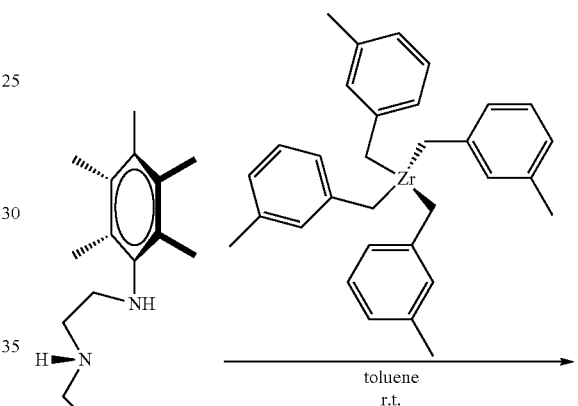

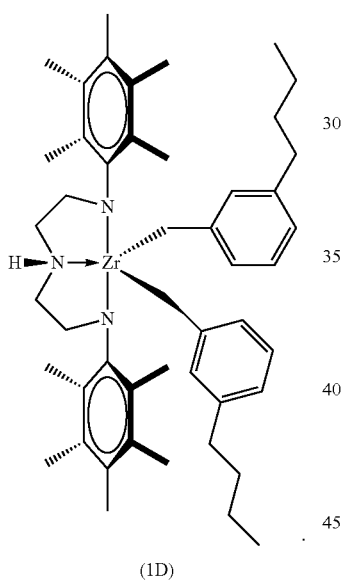

(1D)

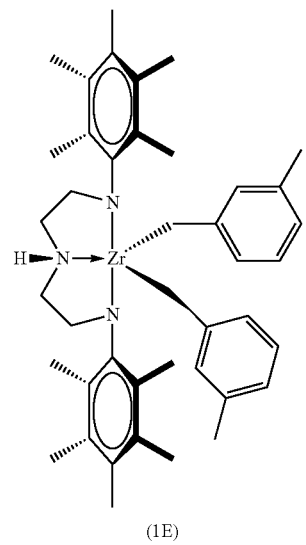

(1E)

Charge a clean oven dried 40 mL vial with a PTFE-coated magnetic stir bar with tetra(3-methylbenzyl)zirconium of Preparation 8 (0.12 g, 0.2 mmol) and 5 mL of dry, degassed toluene. Add the compound 4 as a solid to the vial and stir the mixture at room temperature for 2 hours. Add 30 mL of pentane to the mixture and collect a beige solid by filtration, then wash the solid with 10 mL of cold pentane to give 88 mg of the compound (1E) (53.4% yield). $^1$H NMR (400 MHz, Benzene-$d_6$) δ 7.25-7.10 (m, 1H), 7.05-6.98 (m, 2H), 6.86-6.70 (m, 3H), 5.50 (d, J=7.8 Hz, 1H), 5.44 (s, 1H), 3.53-3.40 (m, 2H), 3.29-3.20 (m, 1H), 3.15 (dt, J=12.0, 5.8 Hz, 2H), 2.69 (q, J=6.1, 5.5 Hz, 3H), 2.57 (td, J=10.9, 5.3 Hz, 2H), 2.47 (s, 6H), 2.42 (s, 6H), 2.29 (s, 3H), 2.24 (s, 7H), 2.15 (s, 7H), 2.10 (s, 7H), 1.98 (s, 3H), 1.78 (s, 2H), 0.91-0.83 (m, OH), 0.87 (s, 2H). $^{13}$C NMR (101 MHz, Benzene-$d_6$) δ 147.27, 141.46, 137.28, 133.33, 132.11, 131.90, 130.95, 130.22, 130.14, 125.71, 124.35, 121.30, 120.39, 63.48, 57.66, 53.13, 49.13, 21.59, 16.77, 16.71, 16.34, 16.27. Measure the light-off performance according to the Light-Off Test Method and measure the according to the Solubility Test Method. Solubility and time to maximum temperature results are reported later in Table 1

Inventive Example 6A (IE6A): making unimodal catalyst system from compound (1A) and activator. Separately feed the slurry activator formulation of Preparation 1B through a catalyst injection tube and feed freshly-prepared precatalyst system of IE3 through a different catalyst injection tube into an in-line mixer, wherein the contact each other to give the unimodal catalyst system, which then flows through an injection tube into the reactor.

Inventive Examples 6B and 6C (prophetic, IE6B and IE6C): replicate the procedure of IE6A except replace compound (1A) with compound (1B) of IE4 or (1C) of IE5 to give unimodal catalyst system made from compound (1B) or (1C), respectively.

Inventive Example 6D (IE6D): replicated the procedure of IE6A except used a freshly prepared solution of compound (1A) (compound (1) wherein M is Zr and each R is $CH_2Si(CH_3)_3$) in hexane and a freshly-prepared solution of methylaluminoxane (MAO) in hexane. Prepared different solutions of (1A) by dissolving measured quantities of compound (1A) in separate aliquots of hexane to give 700 mL of 0.91 wt % compound (1A) in hexane, 700 mL of 1.18 wt % compound (1A) in hexane, and 550 mL of 0.91 wt % compound (1A) in hexane, respectively. The solutions do not need to be chilled but may be transported or stored at 25° C. Separately fed the activator solution through a catalyst injection tube and feed a freshly-prepared solution of compound (1A) through a different catalyst injection tube into an in-line mixer, wherein they contacted each other to give a solution of a unimodal catalyst system, which solution then flows through an injection tube into the reactor.

Inventive Examples 6E and 6F (prophetic, IE6E and IE6F): replicate the procedure of IE6D except replace compound (1A) with compound (1B) of IE4 or (1C) of IE5 to give unimodal catalyst system made from compound (1B) or (1C), respectively.

Inventive Example 6G (IE6G): replicated the procedure of IE6A except used a freshly prepared solution of compound (1A) (compound (1) wherein M is Zr and each R is $CH_2Si(CH_3)_3$) in hexane/isopentane and a freshly-prepared solution of methylaluminoxane (MAO) in hexane. Prepared different solutions of (1A) by adding a measured quantity of compound (1A) of IE3 to a 106 liter (L) capacity cylinder containing hexane. Added 11.3 kilograms (kg) of high purity isopentane to the cylinder to give a precatalyst formulation of 0.10 wt % solution of compound (1A) in hexane/isopentane mixture. The solutions do not need to be chilled but may be transported or stored at 25° C. Separately fed the activator solution through a catalyst injection tube and fed a freshly-prepared solution of compound (1A) through a different catalyst injection tube into an in-line mixer, wherein they contacted each other to give a solution of a unimodal catalyst system, which solution then flows through an injection tube into the reactor.

Inventive Examples 6H and 6I (prophetic, IE6H and IE6I): replicate the procedure of IE6G except replace compound (1A) with compound (1B) of IE4 or (1C) of IE5 to give unimodal catalyst system made from compound (1B) or (1C), respectively.

Inventive Example 7A (IE7A): making a bimodal catalyst system comprising an alkane-soluble non-metallocene catalyst made from compound (1A) and a metallocene catalyst made from (MeCp)(1,3-dimethyl-4,5,6,7-tetrahydroindenyl)$ZrMe_2$, wherein Me is methyl, Cp is cyclopentadienyl, and MeCp is methylcyclopentadienyl. Separately feed the spray-dried metallocene with activator formulation of Preparation 2 through a catalyst injection tube and feed the precatalyst formulation of compound (1A) of IE5 through a different catalyst injection tube into an in-line mixer, wherein the feeds contact each other to form the catalyst system, which then flows through an injection tube into the reactor.

Inventive Examples 7B to 7I (prophetic, IE7B to IE7I): replicate the procedure of IE7A except replace the spray-dried metallocene with activator formulation of Preparation 2 with the catalyst formulation of any one of IE6B to IE6I to give bimodal catalyst system comprising an alkane-soluble non-metallocene catalyst, the activator; and a metallocene catalyst made from the (MeCp)(1,3-dimethyl-4,5, 6,7-tetrahydroindenyl)$ZrMe_2$.

Inventive Example 8A (IE8A): copolymerization of ethylene and 1-hexene using a unimodal catalyst system of IE6A prepared from compound (1A) to make a unimodal poly(ethylene-co-1-hexene) copolymer. For each run, use a gas phase fluidized bed reactor that has a 0.35 m internal diameter and 2.3 m bed height and a fluidized bed primarily composed of polymer granules. Pass fluidization gas through the bed at a velocity of from 0.51 meter per second (m/s) to 0.58 m/s. Exit the fluidization gas from the top of the reactor, and pass the exited gas through a recycle gas line having a recycle gas compressor and heat exchanger before re-entering it into the reactor below a distribution grid. Maintain a constant fluidized bed temperature of 105° C. by continuously adjusting the temperature and/or flow rate of cooling water used for temperature control. Introduce gaseous feed streams of ethylene, nitrogen and hydrogen together with 1-hexene comonomer into the recycle gas line. Operate the reactor at a total pressure of 2410 kilopascals gauge (kPa gauge). Vent the reactor to a flare to control the total pressure. Adjust individual flow rates of ethylene, nitrogen, hydrogen and 1-hexene to maintain gas composition targets. Set ethylene partial pressure at 1.52 megapascal (MPa). Set the 1-hexene/ethylene ($C_6/C_2$) molar ratio to 0.0050 and the hydrogen/ethylene ($H_2/C_2$) molar ratio to 0.0020. Maintain ICA (isopentane) concentration at 8.5 to 9.5 mol %. Measure concentrations of all gasses using an on-line gas chromatograph. Feed freshly-prepared unimodal catalyst system of IE6A into the polymerization reactor at a rate sufficient to maintain a production rate of about 13 to 16 kg/hour poly(ethylene-co-1-hexene) copolymer, while also controlling feed rate to achieve a loading of 50 micromoles of zirconium per gram of spray dried solids. The poly(ethylene-co-1-hexene) copolymer ("resin") is characterized as unimodal molecular weight distribution, an high load melt index (HLMI or $I_{21}$) of 0.21 g/10 minutes, a density of 0.9311 g/cm$^3$, a number-average molecular weight ($M_n$) of 79,727, a weight-average molecular weight ($M_w$) of 610,319, a z-average molecular weight ($M_z$) of 3,197,212, and a molecular weight distribution ($M_w/M_n$) of 7.66. IE8A makes a unimodal high molecular weight copolymer using a unimodal catalyst system comprising an activator formulation that does not comprise a precatalyst, and a precatalyst formulation comprising precatalyst (1) that does not contain activator. Resin particle size and particle size distribution data are shown later in Table 2.

Inventive Examples 8B to 8I (prophetic, IE8B to IE8I): replicate the procedure of IE8A except replace unimodal catalyst system of IE6A with a different one of the unimodal catalyst systems of IE6B to IE6I, respectively, to give a unimodal poly(ethylene-co-1-hexene) copolymer.

Inventive Example 9A (IE9A): copolymerization of ethylene and 1-hexene using a bimodal catalyst system prepared from compound (1A) and a metallocene to make a bimodal poly(ethylene-co-1-hexene) copolymer. Replicate the polymerization procedure of IE8A except instead of feeding the unimodal catalyst system of IE6A feed the bimodal catalyst system of IE7A into the reactor. Adjust the ratio of compound (1A) feed to spray-dried metallocene slurry to adjust the high load melt index ($I_{21}$) of the bimodal poly(ethylene-co-1-hexene) copolymer in the reactor to approximately 6 g/10 minutes. Increase the C6/C2 molar ratio to 0.0060 to reduce the density of bimodal poly(ethylene-co-1-hexene) copolymer. Adjust the feed rate of the spray dried metallocene slurry and compound (1A) solution at a rate sufficient to maintain a production rate of about 13 to 16 kg/hour of the bimodal poly(ethylene-co-1-hexene) copolymer. The bimodal poly(ethylene-co-1-hexene) copolymer produced is bimodal, has an $I_{21}$ of 6.1 g/10 minutes, a melt flow ratio ($I_{21}/I_5$) of 28.9, a density of 0.9476 g/cm$^3$, $M_n$ of 19,194, $M_w$ of 353,348, $M_z$ of 2,920,833, and $M_w/M_n$ of 18.41. The bimodality of the bimodal poly(ethylene-co-1-hexene) copolymer of IE9A is illustrated by the GPC plot shown in FIG. 1. Resin particle size and particle size distribution data are shown later in Table 2.

Inventive Examples 9B to 9I (prophetic, IE9B to IE9I): replicate the procedure of IE9A except use the bimodal catalyst system of any one of IE7B to IE7I, respectively, to give a respective bimodal poly(ethylene-co-1-hexene) copolymer.

Comparative Example 1 (CE1): synthesis of [N'-(2,3,4,5,6-pentamethylphenyl)-N-[2-(2,3,4,5,6-pentamethylphenyl)amino-κN]ethyl]-1,2-ethane-diaminato(2-)κN,κN']zirconium dichloride (abbreviated herein as "HN5Zr dichloride") is described in U.S. Pat. No. 6,967,184B2. Measure the light-off performance according to the Light-Off Test Method. Time to maximum temperature result is reported later in Table 1.

Comparative Example 2 (CE2): synthesis of bis(phenylmethyl)[N'-(2,3,4,5,6-pentamethylphenyl)-N-[2-(2,3,4,5,6-pentamethylphenyl)amino-κN]ethyl]-1,2-ethane-diaminato (2-)κN,κN']zirconium (abbreviated herein as "HN5Zr dibenzyl") may be accomplished by reacting HN5Zr dichloride of CE1 with two molar equivalents of benzylmagnesium chloride in anhydrous tetrahydrofuran. Measure the light-off performance according to the Light-Off Test Method and measure the according to the Solubility Test Method. Solubility and time to maximum temperature results are reported later in Table 1.

Comparative Example 3 (CE3): copolymerization of ethylene and 1-hexene using a comparative unimodal catalyst system made with HN5Zr dibenzyl of CE2 in a spray-dried formulation with hydrophobic fumed silica and MAO to make a comparative unimodal poly(ethylene-co-1-hexene) copolymer. Replicate the procedure of IE8A except using the comparative unimodal catalyst system instead of the unimodal catalyst system of IE6A. The comparative poly(ethylene-co-1-hexene) copolymer is characterized as unimodal molecular weight distribution, an high load melt index (HLMI or $I_{21}$) of 0.20 g/10 minutes and a density of 0.9312 g/cm$^3$. Resin particle size and particle size distribution are shown later in Table 2.

TABLE 1 solubility in hexanes containing at least 60 wt % n-hexane and light-off performance in polymerization of 1-octene.

| Precatalyst | Solubility in Hexanes (wt %) | Light-off Performance (Time to Maximum (minutes) |
|---|---|---|
| HN5Zr dichloride (CE1) | Not measured | 5.2 |
| HN5Zr dibenzyl (CE2) | 0.03 | 78.6 |
| Compound (1A) | 23.3 | 1.3 |
| Compound (1B) | 2.3 | 0.8 |
| Compound (1C) | 0.6 | 1.6 |
| Compound (1D) | 0.13 | 8.7 |
| Compound (1E) | 0.5 | 6.3 |

Compound (1A) has a solubility of at least 23.3 weight percent in hexanes containing at least 60 weight percent n-hexane measured according to the Solubility Test Method. Unpredictably, the solubility of compound (1A) in hexanes is 700 to 800 times greater than the solubility of HN5Zr dibenzyl (CE2) in hexanes.

Compound (1A) has a time to maximum temperature of 1.3 minutes in the Light-Off Test Method. Unpredictably, the time to maximum temperature of compound (1A) is 4 times better than HN5Zr dichloride (CE1) and 60 to 61 times better than HN5Zr dibenzyl (CE2).

As illustrated by the data in Table 1, the compound (1) has significantly increased solubility in alkanes, which enables reduced complexity of transitions between catalyst systems, and has significantly greater light-off performance than those of comparative precatalyst HN5Zr dibenzyl, which can decrease distributor plate fouling in gas phase polymerization reactors. Thus, compound (1) solves the aforementioned problems of prior non-MCN precatalysts.

TABLE 2 resin average particle size and particle size distribution of IE8A and IE9A.

| Particle Property | CE3 | IE8A | IE9A |
|---|---|---|---|
| APS (mm) | 0.071 | 2.3 | 1.1 |
| 2.00 mm (10 mesh) screen (wt %) | 41.2 | 66.52 | 13.30 |
| 1.00 mm (18 mesh) screen (wt %) | 35.5 | 30.98 | 33.19 |
| 0.500 mm (35 mesh) screen (wt %) | 15.3 | 2.08 | 31.85 |
| 0.250 mm (60 mesh) screen (wt %) | 6.0 | 0.24 | 16.82 |
| 0.125 mm (120 mesh) screen (wt %) | 1.7 | 0.10 | 4.31 |
| 0.074 mm (200 mesh) screen (wt %) | 0.3 | 0.10 | 0.53 |
| Bottom Catch Pan (wt %) | 0.1 | 0.00 | 0.00 |
| Fines (wt % of total) | 0.4 | 0.10 | 0.53 |

In Table 2, APS (mm) is average particle size in millimeters. As shown by the data in Table 2, the average particle size of the particles of the unimodal poly(ethylene-co-1-hexene) copolymer of IE8A is 32 times larger than the average particle size of the particles of the comparative unimodal poly(ethylene-co-1-hexene) copolymer of CE3. The average particle size of the particles of the inventive bimodal poly(ethylene-co-1-hexene) copolymer of IE9A is 15 times larger than the APS of the particles of the comparative unimodal poly(ethylene-co-1-hexene) copolymer of CE3.

In Table 2, the bottom catch pan collects any particles that pass through the 0.074 mm (200 mesh) screen. The percent fines is equal to the sum of the wt % of particles that are trapped by the 0.074 mm (200 mesh) screen plus the wt % of particles that pass through the 0.074 mm (200 mesh) screen and are collected in the bottom catch pan. The percent fines of the comparative unimodal poly(ethylene-co-1-hexene) copolymer of CE3 is 4 times greater than the percent fines of the inventive unimodal poly(ethylene-co-1-hexene) copolymer of IE8A.

The invention claimed is:

1. A method of polymerizing an olefin monomer to make a first polyolefin composition comprising a first polyolefin polymer, the method comprising steps (A) to (C): (A) contacting a solution of a first alkane-soluble non-metallocene precatalyst dissolved in an alkane solvent with an activator so as to make a first trim catalyst comprising a first alkane-soluble non-metallocene catalyst; (B) feeding the first trim catalyst into a polymerization reactor; and (C) polymerizing the olefin monomer with the first trim catalyst in the polymerization reactor; thereby making the first polyolefin composition comprising the first polyolefin polymer; wherein the first alkane-soluble non-metallocene precatalyst is characterized by solubility in hexanes containing at least 60 weight percent n-hexane of at least 0.10 weight percent, based on total weight of the first alkane-soluble non-metallocene precatalyst and hexanes, measured using Solubility Test Method.

2. The method of claim 1 wherein the first trim catalyst comprises a solution of the first alkane-soluble non-metallocene catalyst dissolved in an alkane solvent and step (B) comprises feeding the solution into the reactor, the solution being free of a support material.

3. The method of claim 1 further comprising steps (a) and (b): (a) contacting, separately from step (A), a first metallocene precatalyst with an activator and, optionally, a support material so as to make a first metallocene catalyst, optionally free of the support material or disposed on and/or in the support material; and (b) feeding, separately from step (B), the first metallocene catalyst, into the polymerization reactor; and wherein step (C) further comprises polymerizing the olefin monomer with the first metallocene catalyst in the polymerization reactor; thereby making a first bimodal polyolefin composition comprising the first polyolefin polymer and a second polyolefin polymer.

4. The method of claim 3 wherein step (B) comprises feeding the first trim catalyst as a solution of the first alkane-soluble non-metallocene catalyst dissolved in a first alkane solvent into the polymerization reactor; and wherein the step (b) comprises separately feeding a solution of the first metallocene catalyst dissolved in a second alkane solvent into the polymerization reactor; wherein the first and second alkane solvents are the same or different; and wherein the solutions are free of a support material.

5. The method of claim 1 wherein the first trim catalyst further comprises a support material on which the first alkane-soluble non-metallocene catalyst is disposed.

6. A method of polymerizing an olefin monomer to make a first bimodal polyolefin composition comprising a first higher molecular weight (HMW) polyolefin component and a first lower molecular weight (LMW) polyolefin component, the method comprising steps (1) to (5): (1) contacting a solution of a first alkane-soluble non-metallocene precatalyst dissolved in an alkane solvent with an activator so as to make a first trim catalyst comprising a first alkane-soluble non-metallocene catalyst; (2) contacting a first metallocene precatalyst and an additional amount of the first alkane-soluble non-metallocene precatalyst with an activator and, optionally, a support material so as to make a first bimodal catalyst system comprising a first metallocene catalyst and an additional amount of the first alkane-soluble non-metallocene catalyst, optionally free of the support material or disposed on and/or in the support material; (3) contacting the first bimodal catalyst system with the first trim catalyst to make a first mixed catalyst system comprising a mixture of the first bimodal catalyst system and the first trim catalyst; (4) feeding the first mixed catalyst system into a polymerization reactor; and (5) polymerizing the olefin monomer with the first mixed catalyst system in the polymerization reactor; thereby making the first HMW polyolefin component and the first LMW polyolefin component of the first bimodal polyolefin composition; wherein the first ASNM Precatalyst is characterized by solubility in hexanes containing at least 60 weight percent n-hexane of at least 0.10 weight percent based on total weight of the first ASNM Precatalyst and hexanes, as measured using Solubility Test Method.

7. The method of claim 6 further comprising, after step (5), (6) transitioning the method from steps (2) to (5) to steps (2a) to (5a), respectively: (2aa) contacting a second metallocene precatalyst and a second additional amount of the first alkane-soluble non-metallocene precatalyst with an activator and, optionally, a support material so as to make a second bimodal catalyst system comprising the second metallocene catalyst and the second additional amount of the first alkane-soluble non-metallocene catalyst, optionally free of the support material or disposed on and/or in the support material; (3a) contacting the second bimodal catalyst system with the same trim catalyst of step (1) to make a second mixed catalyst system comprising a mixture of the second bimodal catalyst system and the first trim catalyst; (4a) decreasing the feeding of the first mixed catalyst system from a steady-state value until the first mixed catalyst system is no longer being fed into the polymerization reactor and independently initiating and increasing feeding of the second mixed catalyst system into the polymerization reactor until the second mixed catalyst is being fed into the polymerization reactor at a steady-state value; and (5a)

polymerizing the olefin monomer with the second mixed catalyst system in the polymerization reactor; thereby making a second bimodal polyolefin composition comprising the first HMW polyolefin component and a second LMW polyolefin component, which is different than each of the first HMW polyolefin component and the first LMW polyolefin component.

8. The method of claim 1 wherein the olefin monomer is any one of (i) to (vii): (i) ethylene; (ii) propylene; (iii) a ($C_4$-$C_{20}$)alpha-olefin; (iv) 1,3-butadiene; (v) a combination of (i) and (ii); (vi) a combination of (i) and (iii); and (vii) a combination of (i), (ii), and (iv); and wherein the first polyolefin polymer or a HMW polyolefin component respectively comprises any one of (a) to (g): (a) a polyethylene homopolymer; (b) a polypropylene homopolymer; (c) a poly($C_4$-$C_{20}$)alpha-olefin polymer; (d) a polybutadiene polymer; (e) an ethylene-propylene copolymer; (f) a poly (ethylene-co-($C_4$-$C_{20}$)alpha-olefin) copolymer; and (g) an ethylene-propylene-butadiene copolymer.

9. The method of claim 1 wherein the first polyolefin polymer or a HMW polyolefin component has a weight-average molecular weight of at least 110,000 grams per mole (g/mol).

10. The method of claim 1 wherein the polymerizing is a gas phase polymerizing process and the reactor is a single gas phase polymerization reactor.

11. The method of claim 1 further comprising transitioning from step (B) to step (B1) feeding to the polymerization reactor a second trim catalyst, which is made by contacting a solution of a second alkane-soluble non-metallocene precatalyst dissolved in an alkane solvent with an activator to make a second alkane-soluble non-metallocene catalyst; wherein the second alkane-soluble non-metallocene precatalyst is different than the first alkane-soluble non-metallocene precatalyst in structure of at least one non-metallocene ligand and the second alkane-soluble non-metallocene catalyst is different than the first alkane-soluble non-metallocene catalyst in structure of the at least one non-metallocene ligand; wherein the second alkane-soluble non-metallocene precatalyst is characterized by solubility in hexanes containing at least 60 weight percent n-hexane of at least 0.10 weight percent based on total weight of the second alkane-soluble non-metallocene precatalyst and hexanes, as measured using Solubility Test Method; and wherein the transitioning comprises decreasing the feeding of the first trim catalyst from a steady-state value until the first trim catalyst is no longer being fed into the polymerization reactor and independently initiating and increasing the feeding of the second trim catalyst into the polymerization reactor until the second trim catalyst is being fed into the polymerization reactor at a steady-state value.

12. The method of claim 1 wherein the first alkane-soluble non-metallocene precatalyst, and any second alkane-soluble non-metallocene precatalyst, independently is characterized by solubility in hexanes containing at least 60 weight percent n-hexane ($CH_3(CH_2)_4CH_3$) of from 0.50 to 24 wt % based on total weight thereof.

* * * * *

UNITED STATES PATENT AND TRADEMARK OFFICE
CERTIFICATE OF CORRECTION

PATENT NO. : 12,012,475 B2
APPLICATION NO. : 17/279240
DATED : June 18, 2024
INVENTOR(S) : Roger L. Kuhlman et al.

It is certified that error appears in the above-identified patent and that said Letters Patent is hereby corrected as shown below:

In the Claims

At Column 34, Claim number 7, Line number 49, should read: (2a) to (5a), respectively: (2a) contacting a second metallocene Signed and Sealed this
Eleventh Day of February, 2025

Coke Morgan Stewart
*Acting Director of the United States Patent and Trademark Office*